United States Patent
Martin

(10) Patent No.: US 9,493,123 B2
(45) Date of Patent: Nov. 15, 2016

(54) OPEN SIDE WALL MOUNT RACK

(71) Applicant: MARQUETTE MOUNTS, Marquette, MI (US)

(72) Inventor: Robert Martin, Big Bay, MI (US)

(*) Notice: Subject to any disclaimer, the term of this patent is extended or adjusted under 35 U.S.C. 154(b) by 0 days.

(21) Appl. No.: 14/508,949

(22) Filed: Oct. 7, 2014

(65) Prior Publication Data
US 2015/0102077 A1 Apr. 16, 2015

Related U.S. Application Data

(63) Continuation-in-part of application No. 13/624,157, filed on Sep. 21, 2012, now Pat. No. 8,905,280.

(60) Provisional application No. 61/537,688, filed on Sep. 22, 2011, provisional application No. 62/009,577, filed on Jun. 9, 2014.

(51) Int. Cl.
*B60R 9/00* (2006.01)
*F16B 7/02* (2006.01)

(52) U.S. Cl.
CPC .............. *B60R 9/00* (2013.01); *F16B 7/025* (2013.01); *Y10T 29/49826* (2015.01)

(58) Field of Classification Search
CPC ............. B60R 9/00; B60R 9/02; B60R 9/08; B60R 9/10; B60R 9/12
USPC ....... 224/400, 402, 405, 544, 519, 319, 322, 224/321, 325, 324; 280/506; 296/3; 410/104, 105, 150
See application file for complete search history.

(56) References Cited

U.S. PATENT DOCUMENTS

| 3,931,919 A * | 1/1976 | Gerber | B60R 9/10 211/22 |
| 4,416,406 A * | 11/1983 | Popeney | B60R 9/045 224/314 |
| 4,444,427 A * | 4/1984 | Martin | B60P 3/42 224/403 |
| 5,255,951 A * | 10/1993 | Moore, III | 296/3 |
| 5,257,728 A * | 11/1993 | Gibson | 224/403 |
| 5,292,045 A * | 3/1994 | Mandel | B60R 9/00 224/309 |
| 5,303,858 A | 4/1994 | Price | |
| 5,494,327 A * | 2/1996 | Derecktor | 296/3 |
| 5,599,053 A * | 2/1997 | Wilson | B60R 9/00 224/403 |
| 5,611,472 A * | 3/1997 | Miller | B60R 9/00 211/22 |
| 5,699,945 A | 12/1997 | Micklish | |
| 5,848,743 A * | 12/1998 | Derecktor | 224/331 |
| 5,915,900 A * | 6/1999 | Boltz | 410/110 |
| 6,036,069 A * | 3/2000 | Sayegh | 224/324 |
| 6,176,658 B1 * | 1/2001 | Rowe | B60P 7/0815 410/101 |
| 6,309,006 B1 * | 10/2001 | Rippberger | B60J 7/104 296/100.16 |
| 6,394,326 B1 * | 5/2002 | Lanier | 224/405 |
| 6,679,408 B1 * | 1/2004 | Thomas et al. | 224/403 |

(Continued)

*Primary Examiner* — Justin Larson
(74) *Attorney, Agent, or Firm* — Device Patent LLC

(57) ABSTRACT

The present teaching are related to an article and method comprising: a.) a horizontal rail capable of bearing loads; b.) affixed to the horizontal rail are two or more vertical support rails wherein the distance between the vertical support rails may be varied; c.) affixed to the horizontal rail are two or more carrying rails wherein the carrying rails are capable of carrying a load wherein the carrying rails may be moved to multiple positions; wherein the horizontal rail may be affixed to the vertical support rails and the carrying rails are affixed to the horizontal rail directly or through a clamping mechanism, and the vertical support rails are adapted to be affixed to a side wall of the bed of a pick-up truck. The system may be adapted with add-on accessories for carrying articles for transport.

12 Claims, 25 Drawing Sheets

(56) References Cited

U.S. PATENT DOCUMENTS

| | | | |
|---|---|---|---|
| 7,527,324 B1 * | 5/2009 | Clonan | 296/183.1 |
| 7,753,425 B2 * | 7/2010 | Niedziela et al. | 296/3 |
| 8,052,019 B2 * | 11/2011 | Plavetich | B60P 3/06 224/403 |
| 8,113,397 B2 * | 2/2012 | Magnusson | 224/324 |
| 8,414,236 B2 * | 4/2013 | Murphy | 410/104 |
| 8,678,626 B1 * | 3/2014 | Hickman | 362/485 |
| 2001/0042766 A1 * | 11/2001 | Ming-Shun | 224/324 |
| 2005/0023314 A1 * | 2/2005 | Williams et al. | 224/405 |
| 2008/0135592 A1 * | 6/2008 | Corso | B60R 9/02 224/555 |
| 2009/0166390 A1 * | 7/2009 | Flaherty | 224/405 |
| 2014/0117062 A1 | 5/2014 | Kraeuter et al. | |

* cited by examiner

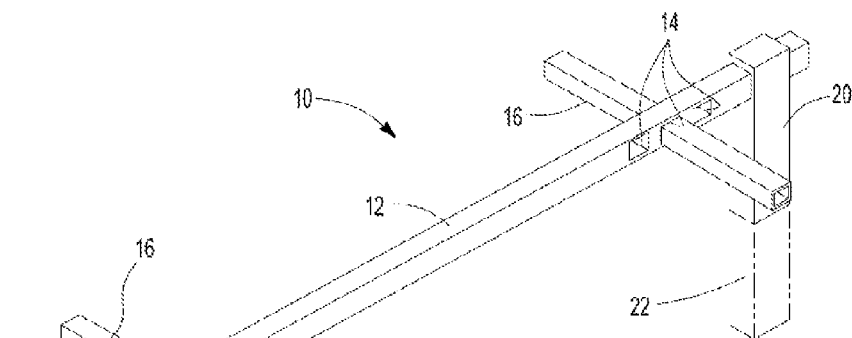
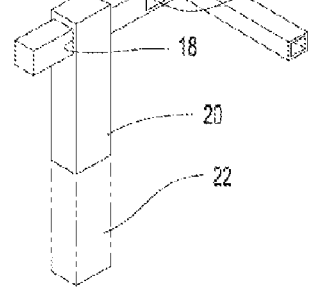
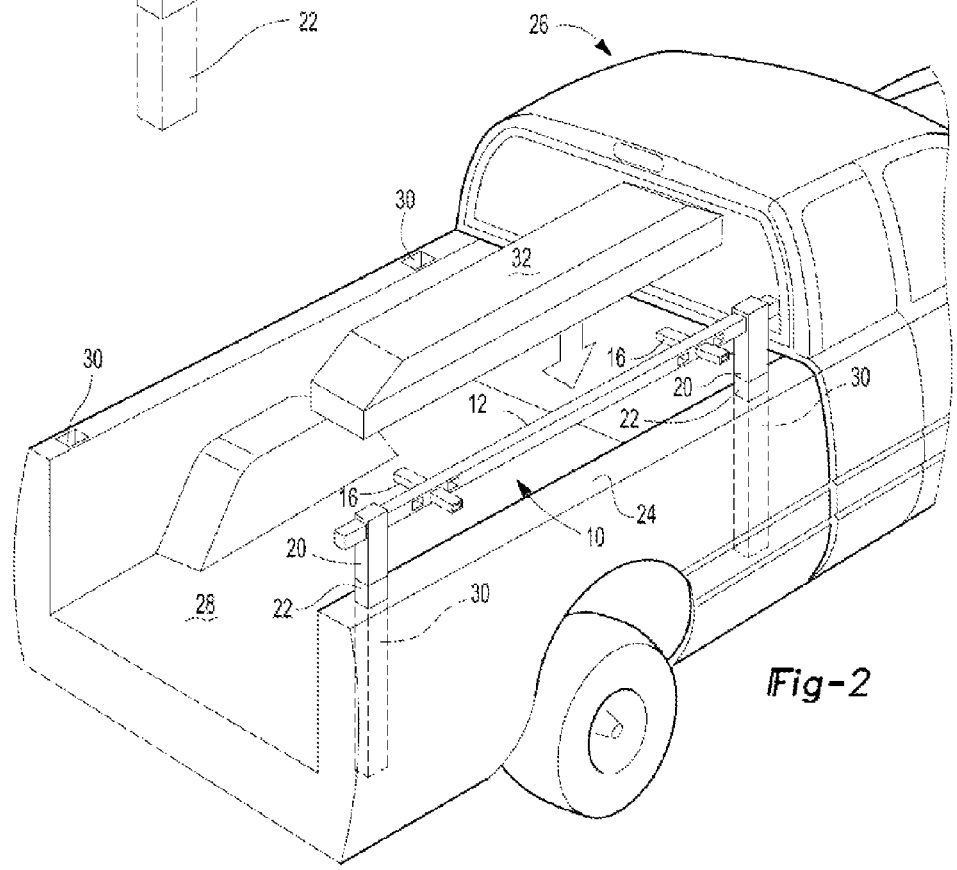
Fig-1
Fig-2

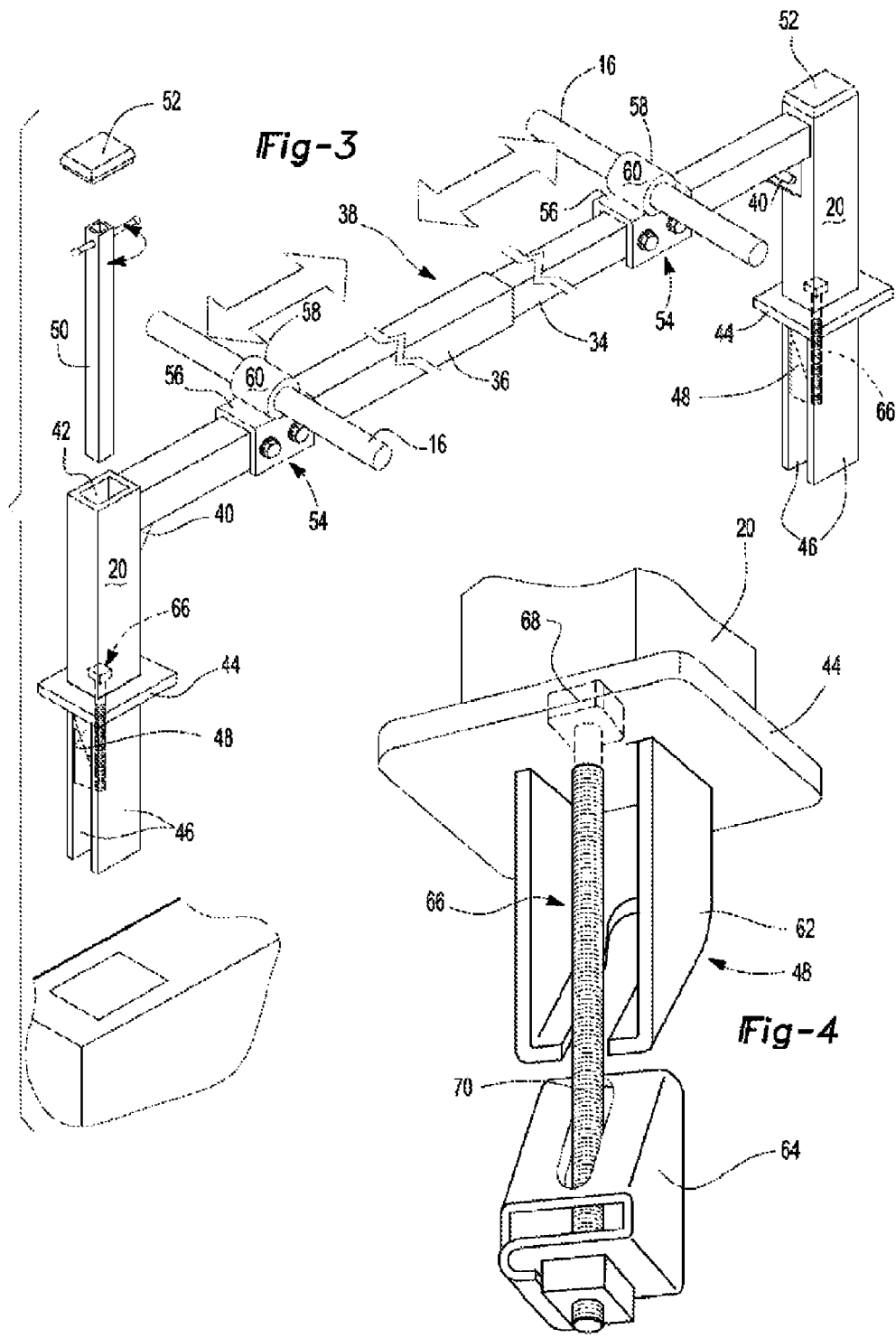

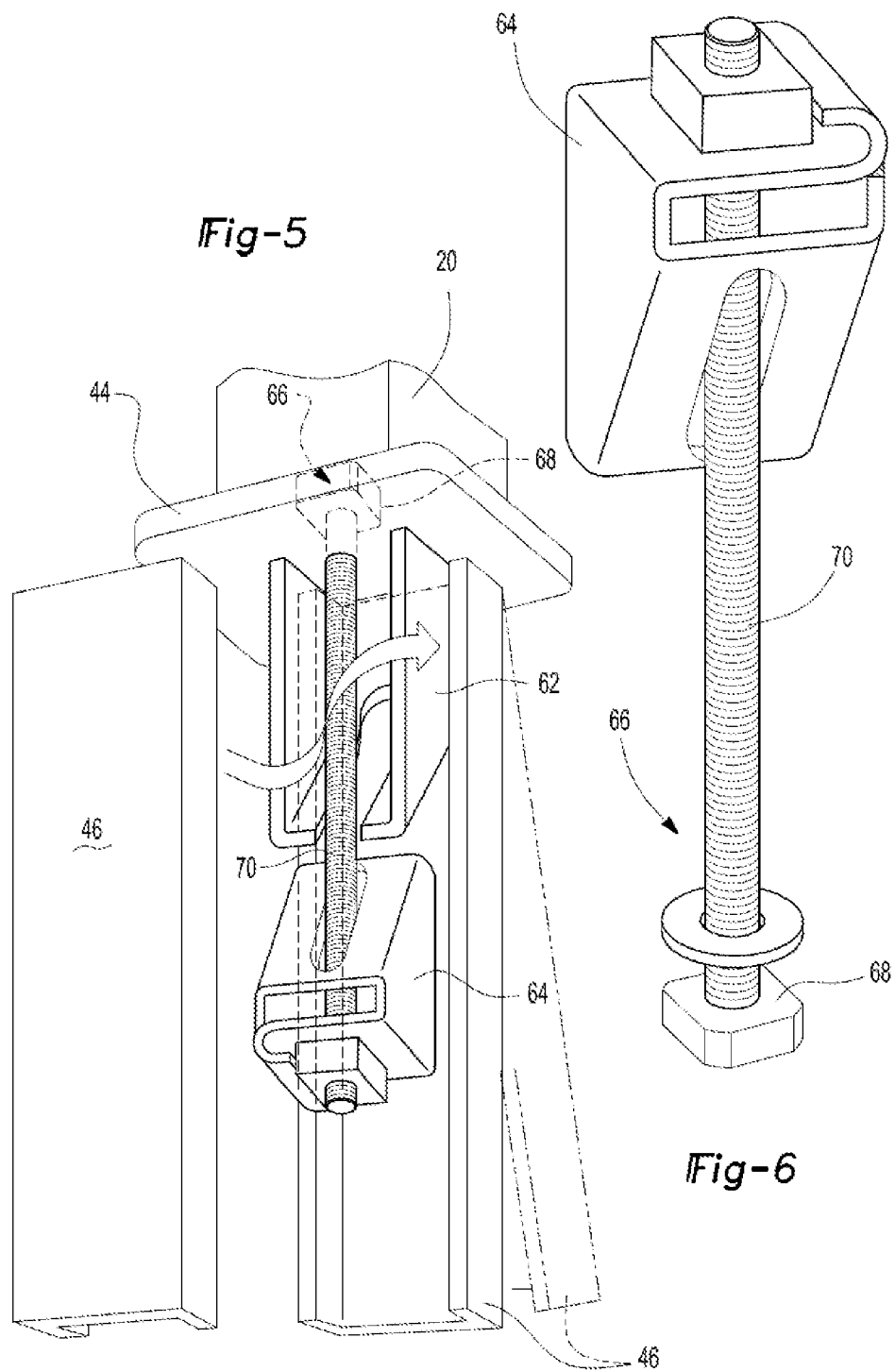

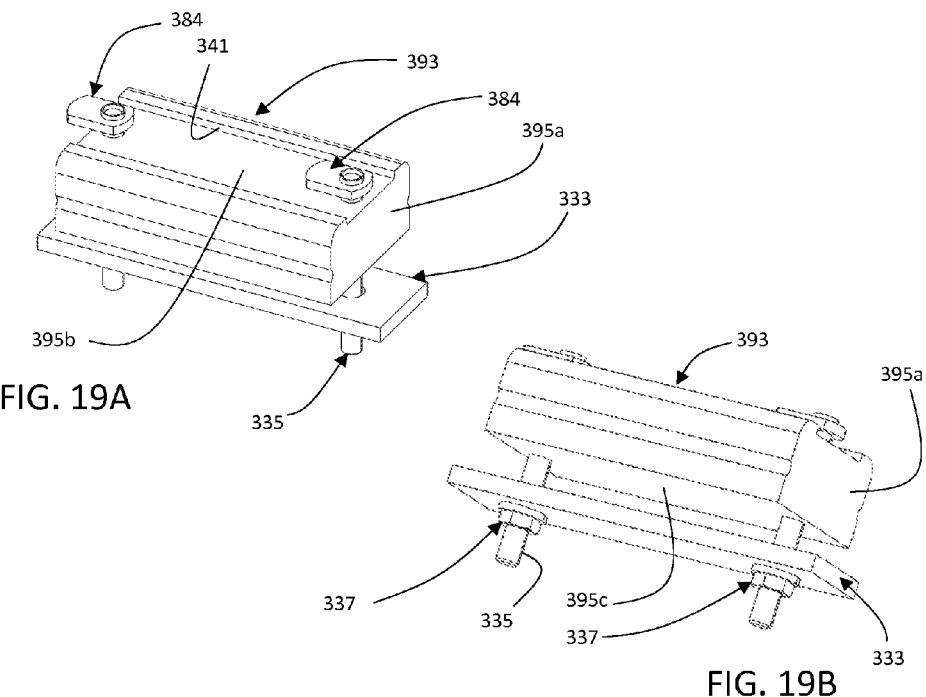
FIG. 19A
FIG. 19B
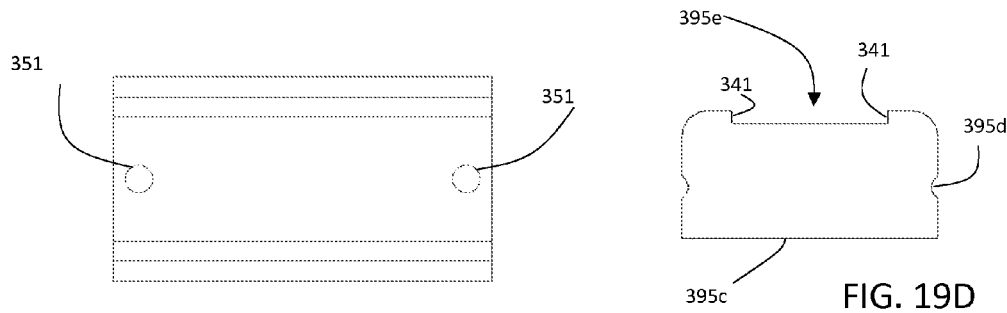
FIG. 19C
FIG. 19D
FIG. 19E

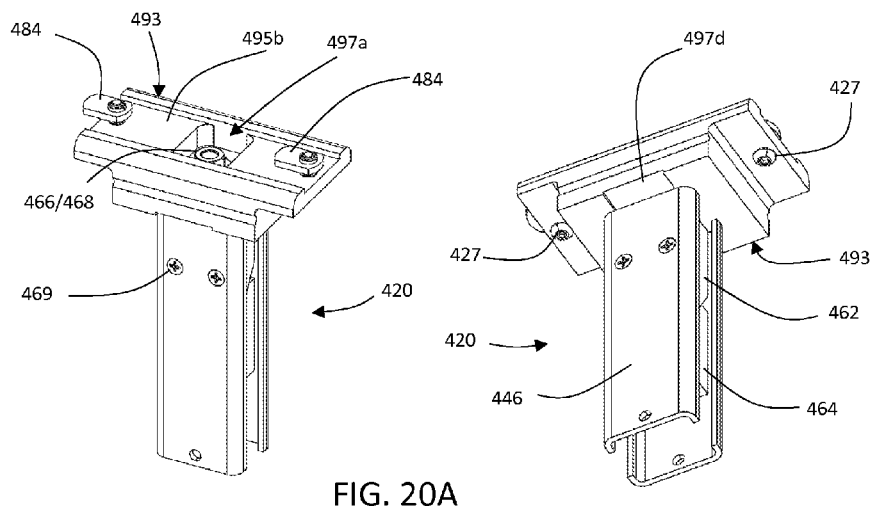
FIG. 20A
FIG. 20B
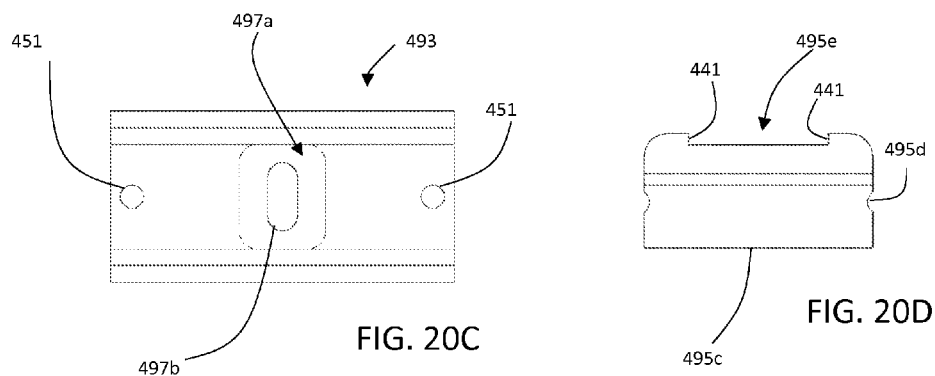
FIG. 20C
FIG. 20D
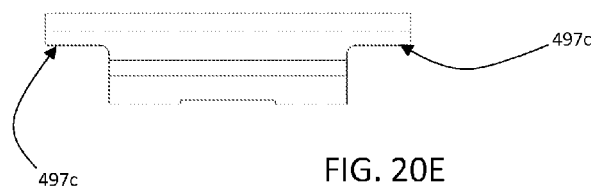
FIG. 20E

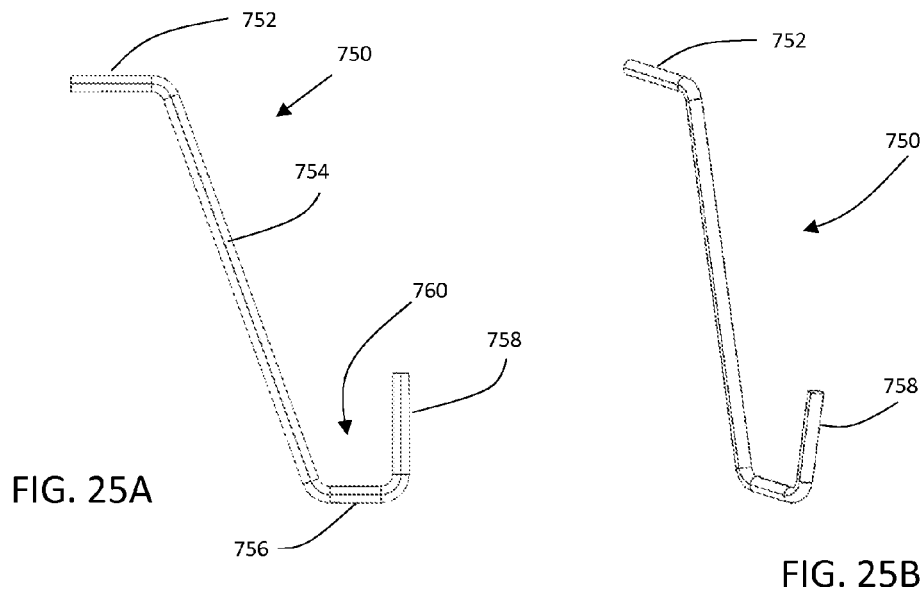
FIG. 25A
FIG. 25B
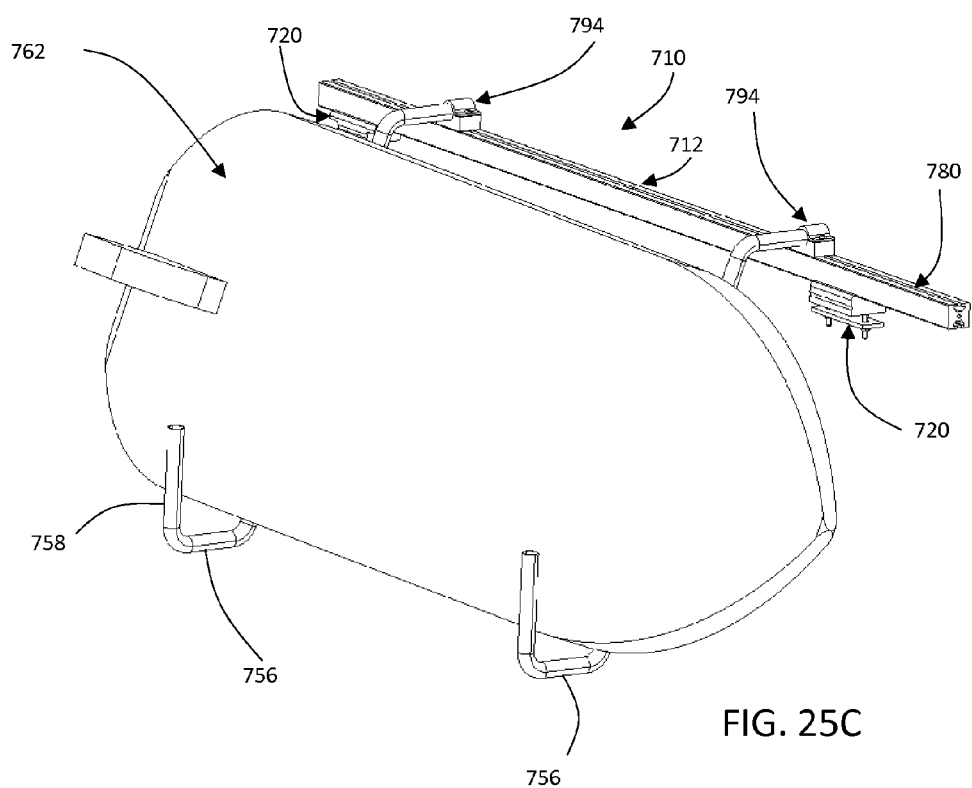
FIG. 25C

OPEN SIDE WALL MOUNT RACK

CROSS REFERENCE TO RELATED APPLICATIONS

This application claims priority to Non-Provisional patent application Ser. No. 13/624,157 filed Sep. 21, 2012, and Provisional Patent Application No. 61/537,688 filed Sep. 22, 2011, and Provisional Patent Application No. 62/009,577 filed Jun. 9, 2014, the entire disclosures of each are hereby incorporated by reference and relied upon.

BACKGROUND OF THE INVENTION

1. Field of the Invention

The present teaching relates to racks mounted to vehicles and more particularly to racks and fixtures connected to the racks that can be mounted on the side of an open bed vehicle, such as a truck for holding cargo.

2. Description of Related Art

Pickup trucks are popular for use in a myriad of ways due to their versatility and ability to carry loads and objects. Racks for use with pickup trucks enhance the ability of the trucks to carry objects, for instance objects that are longer than the bed of the truck. Common racks are disposed over the entire bed and are often custom built to fit the truck. Such racks can otherwise limit the use of the truck bed, make the use of a cover on the bed such as a tonneau cover impractical or impossible, exposing the contents of the bed to the outside elements. The rack also requires a significant amount of time to mount and remove from the truck. Further the mounting of such systems can damage the bed or require that permanent holes be placed in the bed. Further, such systems can be quite expensive to install.

There are a number of pickup truck manufacturers; each one utilizes differences in the design of the beds. Some pickup truck manufacturers provide a number of bed length options. Some beds have pocket or stake holes and some do not. Some provide tie down rings. The design of the beds can vary for a variety of other reasons, both functional and cosmetic. Additionally different objects that users desire to carry in their pickup trucks require different mounting methods.

For users of pickup trucks who utilize their trucks in a variety of ways, the use of such racks is prevented due to the concerns listed above. Many of these users desire a system that can be easily mounted on the bed, does not significantly restrict the use of bed while the rack is in use and still allows the use of the bed cover. Such users also desire a rack that can be adapted to carry a variety of different objects. There are a number of aftermarket carriers for use with trucks that are available for carrying different objects, for instance utility carriers, ski carriers, ski racks, bike racks, tool carriers, and the like. Many truck owners desire racks that can hold and support such carriers.

Thus what is needed is a rack system that can be utilized on a variety of different trucks with different bed designs and lengths, to carry a variety of objects and can be adjusted to carry different objects at different times on the same truck and rack. What is further needed is a rack system that does not restrict the use of the bulk of the bed. What is needed is a rack system that while in use does not interfere with the use of a truck bed cover such as a tonneau. What is needed is a rack system that can be quickly mounted by a variety of methods and removed and can be utilized with a variety of commercially available carriers.

BRIEF SUMMARY OF THE INVENTION

The present teaching address one or more of the above needs by providing an article comprising: a.) a horizontal rail capable of bearing loads; b.) affixed to the horizontal rail are two or more vertical support rails wherein the distance between the vertical support rails may be varied; c.) affixed to the horizontal rail are one or more carrying rails which are disposed in a generally horizontal or generally vertical orientation and perpendicular to the direction of the horizontal load bearing rail wherein the carrying rails are capable of carrying a load wherein the carrying rails may be moved to multiple positions; wherein the horizontal rail may be affixed to the vertical support rails and the carrying rails are affixed to the horizontal rail, and the vertical support rails are adapted to be affixed to a side wall of the bed of a pick-up truck. In one preferred form, one or more support rails include pocket hole insert portions capable of supporting the weight of the article and any load placed on the carrying rails. In preferred forms, the carrying rail has a length that is less than the width between two sides of an open bed vehicle in order to minimize obstructing the bed of a pickup truck for example. In preferred forms, the carrying rail is approximately 24 inches to 28 inches long but may be substantially shorter or longer in other forms. In one form, two or more support rails are bolted to the side wall of a pickup bed. In one form, two or more support rails are clamped to the side wall of a pickup bed. In one form, the support rails may use more than one form of attachment to the side wall. In one preferred form, the horizontal rail includes one or more tracks for adjustable positioning and fixation of the two or more support rails and/or two or more carrying rails at various positions along the tracks. In one form the tracks are integrated into the horizontal rail during extrusion of the horizontal rail. In one form, the horizontal rail comprises a smaller rail nested within a larger rail such that the length of the horizontal rail can be varied and the support rails are affixed to the horizontal rail such that when the length of the horizontal rail may be varied, the distance between the support rails may be varied. In one form, the smaller and larger nested rails include tracks integrated into each nested rail. In one form, the support rails have openings through which the horizontal rail may be disposed and the distance between the support rails may be adjusted by sliding the support rails along the horizontal rail and the support rails may be affixed such that once the distance between the support rails has been selected the distance is maintained. Preferably, the carrying rails are attached to the horizontal rail using sliding attachment mechanisms or clamp assemblies which allow the carrying rails to be held in a desired location. In one form, the horizontal rail has a plurality of openings that the carrying rails can be placed through to adjust the location of the carrying rails. The rack can be affixed to a pick up bed side wall by affixing it to rails on the side wall or by affixing it to the inside of the pickup bed using known fixturing techniques. In a preferred embodiment, the pocket hole insert portion has a wedge assembly, with a shim running along two opposing sides of the wedge assembly.

In one embodiment, the invention is an article comprising a horizontal rail wherein a smaller tube nests within a larger tube creating a telescoping rail, wherein one or more support rails are attached perpendicularly to the smaller tube, one or more support rails are attached perpendicularly to the larger tube, one or more rail mounting brackets are attached in parallel on an upper side of the smaller tube, one or more rail mounting brackets are attached in parallel on the upper side of the larger tube; the support rails have a hollow post extending downward from the horizontal rail, into a pocket hole insert portion, wherein a mounting bolt head rests on a base of the hollow post while a mounting bolt body extends through a hole in a rim base of the hollow post continuing through the pocket hole insert portion; the rail mounting brackets have a bracket, with one or more tube receivers secured perpendicularly on top of the bracket, a carrying rail may be disposed in the tube receiver; wherein the article may be adapted to be secured to a side of a truck to secure one or more objects in line with the side of the truck.

In other embodiments, the carrying rail may be adjustably elevated to various heights through the use of an elevating carrying rail linkage mechanism or by the use of an elevator block between a carrying rail clamp assembly and horizontal rail. This feature is useful for increasing clearance between the carrying rail and truck bed in the event a truck bed cover is used.

In another embodiment, the carrying rail is in the form of a side rack attachment which clamps into a clamp assembly fixed to a horizontal rail which is fixed to the side wall of a pickup bed. The side rack extends away from the side wall of the pickup then downward until terminating in a load cup for supporting loads such as lumber or a surf board on the side of a pickup during transportation.

The articles of the invention can be utilized for a variety of trucks with different designs, different bed lengths and the like. The articles can be quickly mounted and removed from the truck beds and can be adjusted for different objects as desired by the user. For a number of trucks the articles can be mounted without permanently damaging the truck, for instance the body. The articles of the invention can be used with a number of commercially available carriers and can be adjusted to work with different commercially available carriers. In preferred forms, the applicant's device is configured for mounting a horizontal rail adjacent the top side wall of an open bed vehicle such as a pickup bed for a function of leaving the bed unobstructed by the rack system and available for carrying additional cargo. In this form, the article of the invention allows for the use of a cover, such as a tonneau cover, without requiring the one or more carriers and/or cargo, or the actual rack to be removed or rendering the rack system inoperable.

BRIEF DESCRIPTION OF THE SEVERAL VIEWS OF THE DRAWINGS

These and other features and advantages of the present invention will become more readily appreciated when considered in connection with the following detailed description and appended drawings, wherein:

FIG. 1 is one embodiment of the rack of the invention.

FIG. 2 shows mounting a utility carrier on a pickup truck using the embodiment of FIG. 1.

FIG. 3 is another embodiment of the invention.

FIG. 4 is a pocket insert.

FIG. 5 is another view of a pocket hole insert portion of the invention.

FIG. 6 is a mounting bolt body.

FIG. 19A is a top perspective view of a preferred embodiment of the bolt-on style support rail as illustrated in FIG. 18.

FIG. 19B is a bottom perspective view of a preferred embodiment of the bolt-on style support rail as illustrated in FIG. 18.

FIG. 19C is a top view of a preferred embodiment of a fixed spacer block of the bolt-on style support rail as illustrated in FIG. 18.

FIG. 19D is an end view of a preferred embodiment of a fixed spacer block of the bolt-on style support rail as illustrated in FIG. 18.

FIG. 19E is a front view of a preferred embodiment of a fixed spacer block of the bolt-on style support rail as illustrated in FIG. 18.

FIG. 20A is a top perspective view of a preferred embodiment of an expandable support rail as illustrated in FIG. 18.

FIG. 20B is a bottom perspective view the expandable support rail of FIG. 20A.

FIG. 20C is a top view of a preferred embodiment of an expandable spacer block of the expandable support rail as illustrated in FIG. 18.

FIG. 20D is a end view of a preferred embodiment of an expandable spacer block of the expandable support rail as illustrated in FIG. 18.

FIG. 20E is a front view of a preferred embodiment of an expandable spacer block of the expandable support rail as illustrated in FIG. 18.

FIG. 25A is side view of a preferred embodiment of an extension cradle carrying rail.

FIG. 25B is a perspective view of the extension cradle illustrated in FIG. 25A.

FIG. 25C is a perspective view of a cradle assembly holding a surf board utilizing the extension cradle illustrated in FIG. 25A.

DETAILED DESCRIPTION OF THE INVENTION

Figures 7, 8:
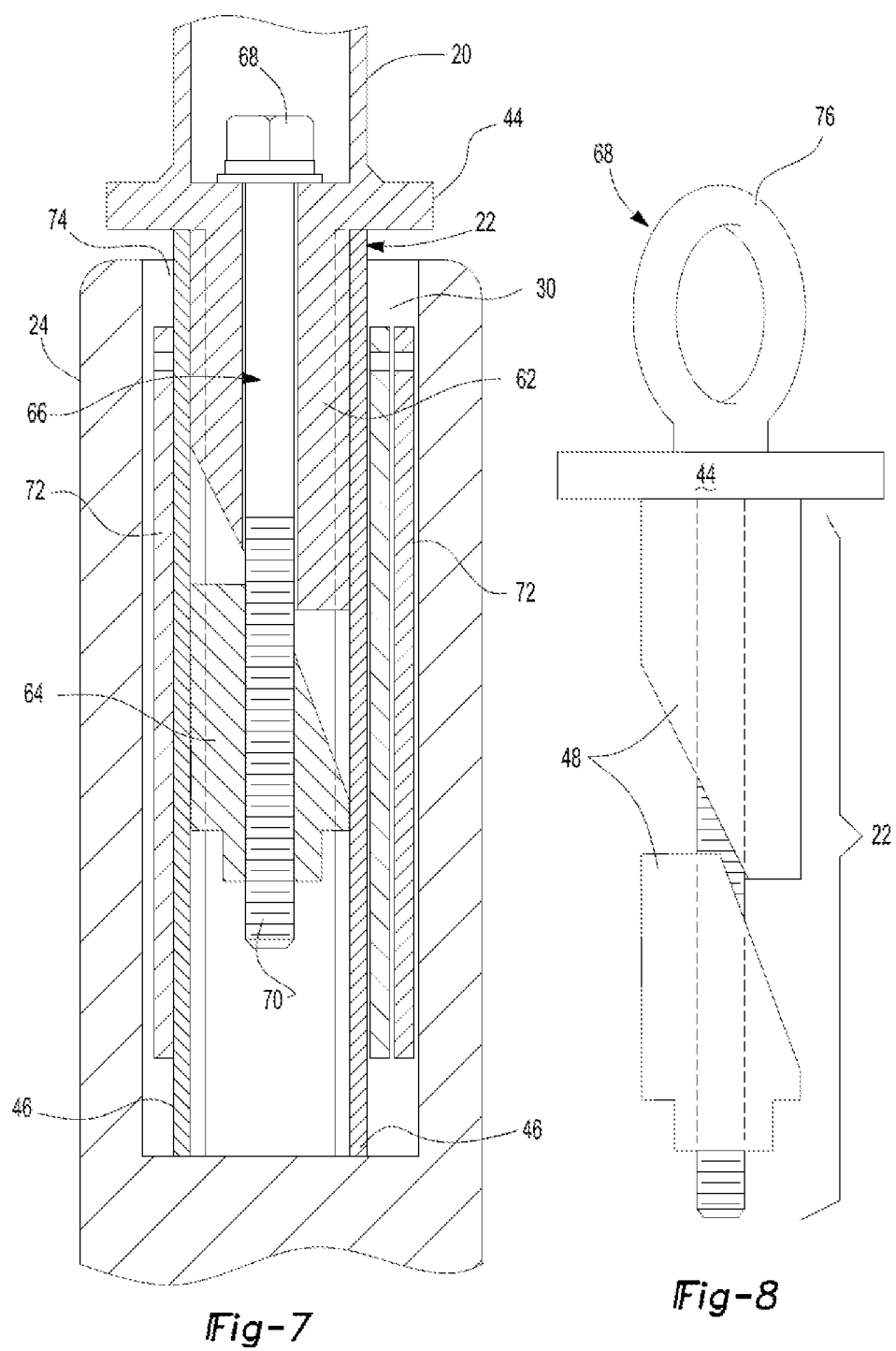
FIG. 7 is a cross sectional view of an embodiment of the pocket hole insert portion within a pocket hole of a truck.
FIG. 8 is a pocket insert having a circular top which can be used to secure object within the bed or to the rack.

The explanations and illustrations presented herein are intended to acquaint others skilled in the art with the invention, its principles, and its practical application. The specific embodiments of the present invention as set forth are not intended as being exhaustive or limiting. The scope of the invention should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description. In many cases similar features from various embodiments are labeled in the figures with similar numbers offset by a multiple of 100.

The article of the invention can be used with any vehicle having open rear sides, that is open to the air and has sides on the rear that can be utilized to mount the rack, for instance a pickup truck, a stake truck, an SUV with an open bed and the like. The rack may be disposed on one of the sides of the vehicle running front to back and can be referred to as a half rack. The rack for many of the vehicles can be reversed in the sense that either end can be placed toward the front of the vehicle.

The rack comprises a horizontal rail capable of bearing loads. This rail functions to support objects supported on and carried by the article of the invention. The horizontal rail further functions to support carrying rails and to facilitate adjustment of the location of the support rails and the carrying rails. The horizontal rail can be in any configuration that facilitates these functions. The horizontal rail may be a unitary rail or comprise two or more rails that fit together and perform the recited function. The horizontal rail preferably has sufficient strength to support the loads of the objects to be carried on the rack. Preferably the horizontal rail can withstand a load of 150 pounds or greater, more preferably 200 pounds or greater and up to about 600 pounds. The horizontal rail can be prepared from any material that performs the recited function, for example engineered polymers (polycarbonate (PC), nylon, ABS (acrylonitrile butadiene styrene), styrenics, filled polyolefins, filled polyolefins modified with elastomeric materials, and blends thereof (PC-ABS) and the like; steel, magnesium, aluminum and the like. In one embodiment of the rack, the horizontal rail may be formed by two or more halves of a rail of equal length that when secured as a unit by an end cap form a unitary rail. In an embodiment of the horizontal rail the top of the rail may be open. In a further embodiment of the horizontal rail the rail has either an internal or external track capable of moving and securing a load. In another embodiment the horizontal rail may contain two or more holes running perpendicularly from one side of the horizontal rail to the other.

The articles of the invention comprise two or more support rails adjustably attached to the horizontal load bearing rail. Adjustably attached means that the distance between the two or more support rails can be varied to fit the vehicle. In one embodiment the horizontal rail is formed of a single rail. In one embodiment the horizontal rail may be formed by two or more rails at least one horizontal rail may be placed inside the outer most horizontal rail, where the movement of inner most horizontal rail in and out of the outer most horizontal rail adjusts the distance between the two supports. In another embodiment the two or more support rails may be connected to an internal or external track of the horizontal rail on which the support rail may be adjusted to the appropriate location. In a further embodiment of the support rails, the upper end of the support rails may contain a hole which runs through the entire support rail in order to accept the horizontal rail. Once the correct distance on a vehicle is determined the support rail may be adjusted. Additionally when an adjustment is made and the support rails are secured, movement of the horizontal rail may be prevented. The method of preventing movement of the two rails with respect to one another can be any known to the skilled artisan. The support rails further function to support the load on the horizontal rail and to prevent the rack from moving in a significant manner in any direction. Preferably the support rails hold the rack perpendicular to the plane of the bed of the truck. The support rails include portions used to affix the rack to the side of the bed. Where the rack may be attached to the vehicle in pocket holes, the support rails include pocket hole insert portions such that the support rails can perform their function. In some embodiments the pocket hole insert portions contain receivers in which the support rails are placed. Such receivers preferably contain channels that the bottom end of the support rails are placed in. The length, shape and size of the channel must be such that the support rails are capable of supporting the rack as described herein. The support rail may be affixed to the pocket hole insert portion using any known affixing method known to one skilled in the art, for examples bolts, inference fit, set screws, adhesives, snap fits, and the like. The support rails may be fabricated from any materials which allow them to perform their function, for example engineered polymers (polycarbonate (PC), nylon, ABS (acrylonitrile butadiene styrene), styrenics, filled polyolefins, filled polyolefins modified with elastomeric materials, and blends thereof (PC-ABS) and the like; steel, magnesium, aluminum and the like. Any of the materials useful for the horizontal rails may be utilized for the support rails. The support rails and the horizontal rails may be fabricated from the same or different materials. The support rails must be capable of supporting the same loads as the horizontal rail. The support rails may be capable of receiving a fixed carrying rail which sits above the plane of the horizontal rail. In some embodiments the support rails may be hollow tubes. In one embodiment of the invention a mounting bolt is located within the support rail so that the head of the bolt rests on the inside bottom of a hollow support rail, allowing the bolt to pass through into a pocket hole insert portion. In some embodiments of the invention where the top of the support rail is open a cap may be placed on top of the opening. In some embodiments where a portion of the device may collect water or other undesirable elements, a sealing strip or cap may be using to keep these elements out. Likewise, caps or other covering may be used to cover sharp edges.

In preferred embodiments, the horizontal rail of the article further comprises two or more carrying rails but may include as few as one. In some embodiments the carrying rails are disposed on the horizontal rails or within an intermediate clamp assembly and function to hold the load on the rack. Preferably the carrying rails are disposed in a horizontal plane parallel to the bed and are generally perpendicular to the direction of the horizontal rail. In other embodiments, the carrying rails are positioned in other directions such as vertical. The carrying rails preferably can be moved to adjust the distance between the carrying rails to adapt to supporting a variety of load carrying systems. The number of carrying rails can be adjusted to fit the needs of the user and the load carrying system. The number is preferably 2 or greater but could be less. The upper number can be any amount needed for the user needs and the load carrying system, and are preferably 6 or less and more preferably 4 or less. In some embodiments, the carrying rail may not be in the form of an elongated member but rather a specialized clamp such as for clamping the fork or the wheel of a bicycle. The system of the invention can be adapted to allow additional carrying rails at any time. The method of affixing the carrying rails to the horizontal rail can provide for a set number of locations or can provide that the carrying rails can be located in any position along the horizontal load bearing rail. Preferably the carrying rails can be moved transversely with respect to the horizontal load bearing rail to facilitate adjusting them to the needs of the user and the load carrying system used with the rack. The transverse movement can be to set locations or allow the carrying rail to be in any location with respect to the horizontal rail. Once the locations along the horizontal rail and in the transverse direction are selected, the carrying rails may be affixed in place in a reversible manner to prevent movement. Again, although the term 'carrying rail' is used a carrying rail may be in the form of a specialized attachment such as clamp for the front fork of a bicycle. The carrying rails may be fabricated from any materials which allow them to perform their function for example engineered polymers (polycarbonate (PC), nylon, ABS (acrylonitrile butadiene styrene), styrenics, filled polyolefins, filled polyolefins modified with elastomeric materials, and blends thereof (PC-ABS) and the like; steel, magnesium, aluminum and the like. Any of the materials useful for the horizontal rails may be utilized for the carrying rails. The carrying rails and the horizontal rails may be fabricated from the same or different materials. The carrying rails must be capable of supporting the same loads as the horizontal rail. In one embodiment of the invention the carrying rails are attached to the horizontal rail by a carrying rail mounting bracket or clamp assembly that is secured to the horizontal rail by any means that allows the rail mounting bracket to move along the horizontal rail to a desired position before being secured, by any means known in the art for example a bolt and nut, a set screw, a snap fit, and the like. The carrying rail mounting bracket may comprise tube receivers that may be adjustable in height and position along the carrying rail mounting bracket. The carrying rail may be positioned in a horizontal or vertical direction when attached to the horizontal load bearing rail. The location of the carrying rails in the carrying rail mounting brackets and the tube receivers can be fixed by any known means in the art including bolts and nuts, set screws, snap fits, adhesives and the like. The horizontal load bearing rail may contain a number of holes passing transversely through the rail for holding carrying rails in place and allowing for adjustment of the location and distance between carrying rails to fixed locations. Such holes facilitate location of the carrying rails perpendicular to the horizontal load bearing rail and adjustment of the carrying rails in the transverse direction of the horizontal load bearing rails so as to adjust them for different carrying systems.

The system may further comprise a system for attaching the support rails to the vehicle, preferably to the side of the bed. Alternatively if the bed is a flatbed the support rails can be attached to any fixturing area provided for on the flat bed. The support rails may include pocket hole insert portions and the insert portion can be placed in the pocket holes of the bed sides. The support rails can be affixed to the bed side wall utilizing any fixturing system. For instance, the support rails can be welded or bolted to the side walls. Channels can be affixed to the side walls and the support rails or pocket hole insert portions can be disposed in the channels. The support rails could be welded to the bed side walls although this limits the ability to easily remove the rack or use a cover with the rack.

In a preferred embodiment the article further comprises a pocket hole insert portion of the support rail which is adapted to support the rack and hold it in place. The pocket hole insert portion functions to transfer the load to the body of the vehicle, hold the rack in place, preferably hold it perpendicular to the bed plane, prevent the rack from moving during use and prevent damage to the body of the vehicle (bed side wall). The pocket hole insert portion may comprise a receiver for the support rails which functions to hold the support rails in place and provide the necessary rigidity, load bearing support and stability. The support rail may be affixed to the receiver in any known manner, screws and bolts, set screws, adhesives, interference fit, snap fits and the like. The pocket hole insert portion may further comprise support shims that function to sit on the bottom of the pocket hole and to hold the other elements of the pocket hole in place and to prevent such parts from damaging the vehicle body. For instance the shims may be sufficiently long enough to hold other parts of the pocket hole insert above the bed side wall to prevent them from damaging the body. The pocket hole insert portion may comprise spacers for filling the space between the shims and the inside walls of the pocket hole to enhance the stability and in some embodiments create an interference fit. The spacers can be adjusted in shape to fit a particular vehicle and may be a polymeric material, elastomeric material or metal as described herein. The pocket hole insert portion may further comprise an intermediate structure. Preferably the intermediate structure contains a horizontal flange that covers the pocket hole and extends beyond the pocket hole to protect the opening of the pocket hole. Preferably the shims are long enough to keep this flange from contacting the vehicle body. Preferably the shims are affixed to the intermediate structure in a manner that the shims can be moved transversely with respect to the pocket hole so as to force the spacers or shims against the walls of the pocket hole. The pocket insert portion further comprises an extender disposed between the shims adapted to push the shims against the walls of the pocket hole. Any extender system that performs this function may be used, for instance a mechanical system such as opposing wedges as described hereinafter, injectable high density foam, springs, scissor structures, and the like. Preferably the pocket hole insert portion has an expansion adjuster for the expander on the support receiver side such that a user can adjust the expansion of the expander. Preferably the expansion can be increased for mounting and decreased for removing the rack. The expansion adjuster is in contact with the mechanical system that allows it to expand. The adjuster can be a spring, a bolt with threads, or any other mechanism that can translate movement to expand the expander. In a preferred embodiment of the pocket hole insert portion a mounting bolt extends downward through the support rail and into the pocket hole insert portion, where a first wedge is attached to the base of the support rail by any means known in the art, for example welding. The mounting bolt proceeds to run through the first wedge where it passes through a second wedge. Upon the tightening of the mounting bolt the second wedge moves from its position below the first wedge to a position along the second wedge. In some embodiments of the invention shims are placed on either side of the wedges beginning at the top of the pocket hole insert portion down through past the wedges. The wedges may be fabricated from any materials which allow them to perform their function for example engineered polymers (polycarbonate (PC), nylon, ABB (acrylonitrile butadiene styrene), styrenics, filled polyolefins, filled polyolefins modified with elastomeric materials, and blends thereof (PC-ABS) and the like; steel, magnesium, aluminum and the like. Any of the materials useful for the horizontal rails may be utilized for the wedges. In some embodiments, when the rack is secured into the pocket holes of a truck two or more shims are placed into the pocket hole prior to the pocket hole insert portion to prevent the base of the support rail rim, or the horizontal rail from resting on the pocket hole lip of the pocket hole. In other embodiments, the support rail rim may lay directly on a bed liner or other cushioning device. In some embodiments shims are used in the pockets of a truck and are placed into the truck and run from the base of the pocket hole to the bottom of the rim base. Shims may be fabricated from any materials which allow them to perform their function for example engineered polymers (polycarbonate (PC), nylon, ABS (acrylonitrile butadiene styrene), styrenics, filled polyolefins, filled polyolefins modified with elastomeric materials, and blends thereof (PC-ABS) and the like; steel, magnesium, aluminum and the like. Any of the materials useful for the horizontal rails may be utilized for the shims. Shims may come in various sizes and shapes to accommodate the inside of a pocket hole or other securing means in order to provide the most secure fit of the invention. In some embodiments of the invention to insure a secure fit one or more spacers are placed into the pocket holes of a truck prior to the insertion of the shims. Spacers may be fabricated from any materials which allow them to perform their function for example engineered polymers (polycarbonate (PC), nylon, ABS (acrylonitrile butadiene styrene), styrenics, filled polyolefins, filled polyolefins modified with elastomeric materials, and blends thereof (PC-ABS) and the like; steel, magnesium, aluminum and the like. Alternatively the shims may be prepared from an elastomeric material that may be compressed for use and which facilitates forming an interference fit. Examples include, polyurethans, EPDM, elastomer modified polyolefins and the like. Any of the materials useful for the horizontal rails may be utilized for the spacers. Preferably the spacers are fabricated from a material having a deflection ability of 70 duro or greater, more preferably 80 duro or greater and up 100 duro. Shims may come in various sizes and shapes to accommodate the inside of a pocket hole or other securing means in order to provide the most secure fit of the invention.

A basic embodiment of the rack 10 of the invention is illustration of FIG. 1. In this particular embodiment the horizontal rail 12 contains perpendicular holes 14 that run from one side of the horizontal rail 12 to the other allowing the carrying rails 16 to be placed within. The perpendicular holes 14 also allow the carrying rails 16 to be placed in different perpendicular holes 14 as needed and to be adjusted side to side. Either end of the horizontal rails 12 may slide through an upper hole 18 of each support rail 20 allowing for the adjustment of the length between the two support rails 20. The two support rails 20 then sit on pocket hole insert portion 22.

The basic rack 10 embodiment of FIG. 1 is shown in FIG. 2 being mounted to a side wall 24 of a truck 26 with an open back side or bed 28. More specifically the pocket hole inserts portion 22 of the basic rack 10 are inserted into the pocket holes 30 which are along a side wall 24 of the truck 26. A utility carrier 32 can then be mounted on to the carrying rails 16 once they are secured in the horizontal rail 12 and the rack 10 is secured in the pocket holes 30 of the truck 26.

Figure 26A:
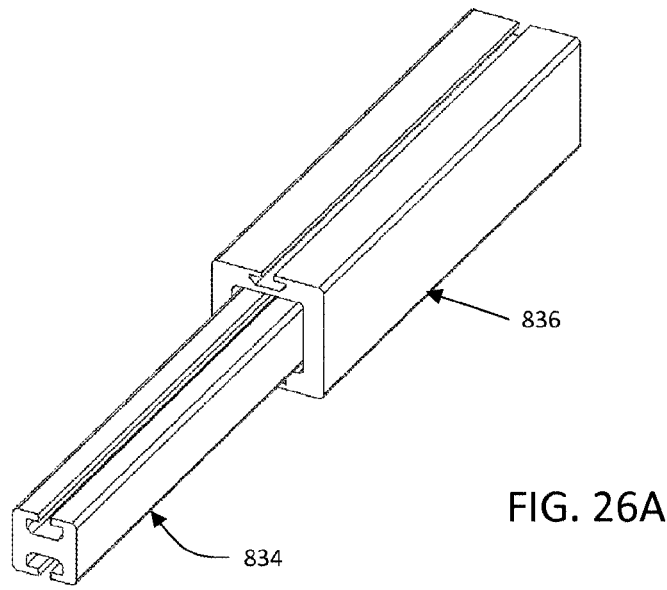
FIG. 26A is a top perspective view of a nested inner horizontal rail within an outer horizontal rail wherein tracks are integrated within the rail.
Figure 26B:
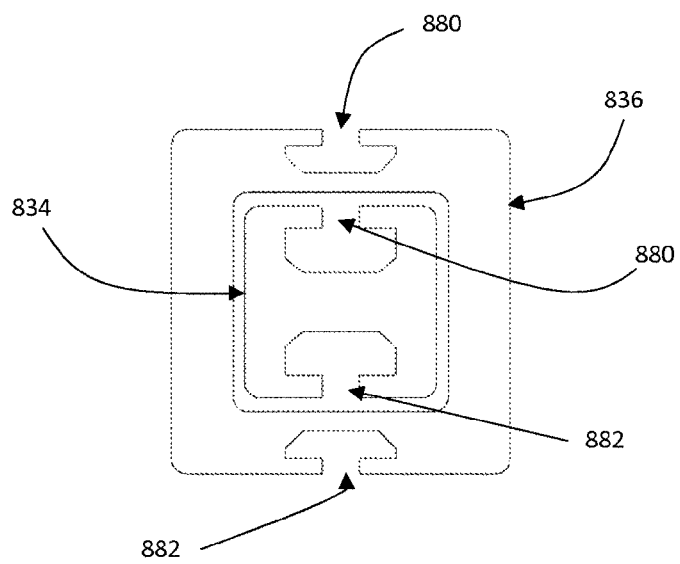
FIG. 26B is an end view of nested inner and outer horizontal rails with an integrated track as illustrated in FIG. 26A.

Another embodiment of the invention is illustrated in FIG. 3. In this embodiment a smaller diameter horizontal rail 34 is nested inside of a larger diameter horizontal rail 36 to create a telescoping horizontal rail 38 is used. An additional example is illustrated in FIGS. 26A and 26B illustrating nesting of a smaller diameter rail 834 inside a larger diameter rail 836. Here the rails include integrated tracks 880 and 882 for attachment of support rails and carrying rails. The telescoping horizontal rails allow the support rails 20 (FIG. 3) to move closer together and farther apart in this embodiment. The support rails 20 and the telescoping horizontal rail 38 (FIG. 3) may form a 90 degree angle wherein a triangle tie down 40 is between the two supports. The triangle tie down may be made of any other material that is useful for the creation of the triangle tie down 40 which allow it to perform its function, for example engineered polymers (polycarbonate (PC), nylon, ABS (acrylonitrile butadiene styrene), styrenics, filled polyolefins, filled polyolefins modified with elastomeric materials, and blends thereof (PC-ABS) and the like; steel, magnesium, aluminum and the like. Any of the materials useful for the horizontal rails 38 may be utilized for the triangle tie downs 40, but it does not have to be the same material used. The support rails 20 in this embodiment are hollow tubes 42, which end at a rim base 44 where the pocket hole insert 22 portion begins. The pocket hole insert portion may be considered a lower portion of the support rail. The pocket hole inserts portion 22 each having two shims 46 and a wedge system 48. The wedge system 48 is activated when a mounting bolt 66 is tightened when the mounting bolt head 68 having a unique shape is turned by a vertical tube 50, which fits the mounting bolt head 68. Once the rack is secured to a vehicle a cap 52 is placed on to the support rails 20. The telescoping rail 38 may have one mounting bracket 54 on each half of the rail. The mounting bracket 54 (or clamp assembly) includes a bracket 56 with at least one tube receiver 58 that is secured perpendicularly on top of the bracket 56. In this embodiment the tube receiver is directed horizontal, however in other embodiments the receiver can assume other orientations such as generally vertical as might be needed for attachment of a snowboard carrier. A carrying rail 16 is inserted into the tube receiver 58 where it can then receive cargo such as a utility carrier 32. The carrying rail 16 may or may not be secured within the tube receiver with a securing mechanism 60, such as a bolt, screw, lock, snap, or any other means known in the art.

The pocket hole insert portion of a support tube is illustrated in FIGS. 4 and 5. The pocket hole insert portion 22 that rests below the rim base 44 of the support rail 20 is shown in greater detail. As illustrated in FIG. 4 the wedge system 48 is made up of an upper wedge 62, lower wedge 64 and mounting bolt 66. On the other side of the rim base 44 is the mounting bolt head 68 as illustrated in FIG. 5. When the mounting bolt head 68 is tightened the lower wedge 64 raises up into the upper wedge 62, forming a secure fit with the shims 46 in a pocket hole. The mounting bolt body 70 that runs through the wedge system 48 is illustrated in FIG. 6, as it is attached to the lower wedge 64.

A cross sectional view of the various elements of a pocket hole insert portion within a pocket hole 30 of a truck 26 are illustrated in FIG. 7. One or more spacers 72 are placed into the pocket hole 30 of a truck 26 followed by the shims 46 which are placed so that they run parallel with the side wall 24 of the truck 26. The shims 46 are also placed so that they extend to the bottom of the pocket hole and extend slightly above the pocket hole lip 74 of the truck 26, allowing the rim base 44 of the support rail 20 to sit above the pocket hole lip 74.

Another embodiment of a pocket hole insert portion 22 having a wedge system 48 is illustrated in FIG. 8. In this embodiment a mounting bolt head 68 with a circular top 76 is shown to be above the rim base 44. The circular top can be used to secure objects to the rack or within the bed of the truck. One or more pocket hole insert portions with a circular top may be placed in one or more pocket holes of a vehicle to be used as a tie down system without the rack.

Figure 9:
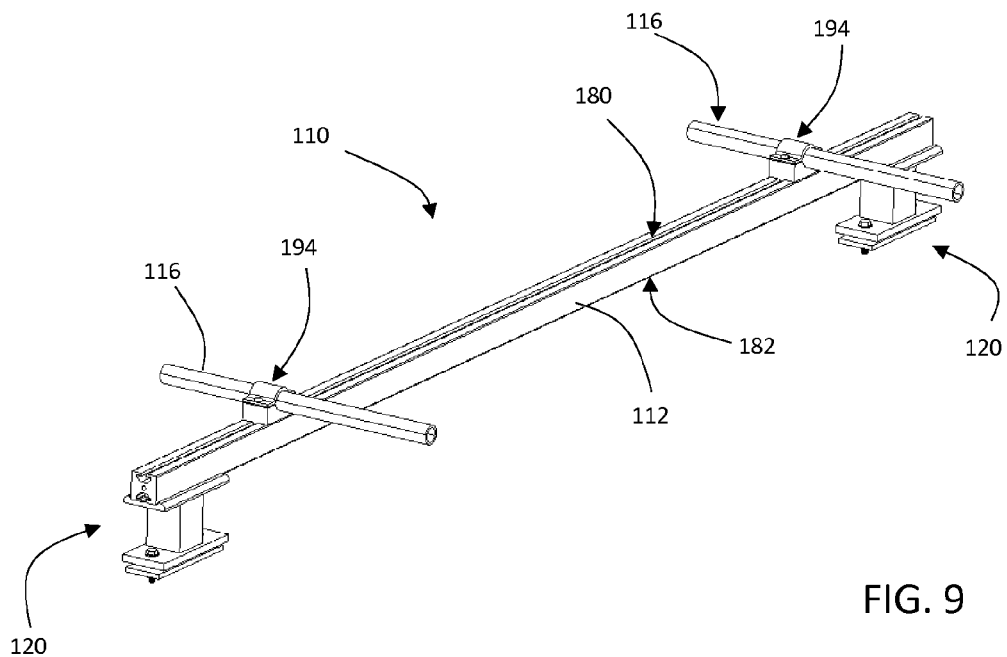
FIG. 9 is a top perspective view of an alternative embodiment of a rack with a bolt-on style support rail.

A preferred form of a rack is illustrated in FIG. 9. Rack 110 may also be referred to as a half rack. It comprises a horizontal rail 112 sized to support loads mounted on rack 110. Extending between horizontal rail 112 and a vehicle or trailer is one or more support rail 120. In this embodiment rack 110 is configured for mounting on the top of the side wall of the bed of a pickup truck as illustrated with earlier embodiments in FIG. 2. The horizontal rail 112 comprises one or more tracks configured for holding a load. In some embodiments the tracks may be in the form of an external track, but here the tracks are in the form of internal tracks comprising an upper track 180 and a lower track 182. In other embodiments the track may positioned to face directions other than up and down and may be more broadly referred to as a first track, a second track etc. In preferred forms, horizontal rail 112 is in the form of an aluminum alloy extrusion having tracks 180, 182 integrated therein. Tracks 180, 182 may assume other forms, for example the tracks may be affixed on or machined in horizontal rail 112.

Each track 180, 182 is configured to house a track lock. In this embodiment, FIG. 10-11, the track lock is in the form of a track plate 184, 186. The track lock is sized to slidingly reside within an enlarged track passage 192 within the internal track but is too large to escape the track window 190. The track plate 184, 186 in this embodiment, is in the form of a generally rectangular bar with one or more threaded clamp holes 188 extending therethrough. The track lock may be configured in other forms such as a threaded nut. When residing within the upper track 180, the track plate is referred to as the upper track plate 184 and when in the lower track 182 it is referred to as the lower track plate 186.

Figure 14:
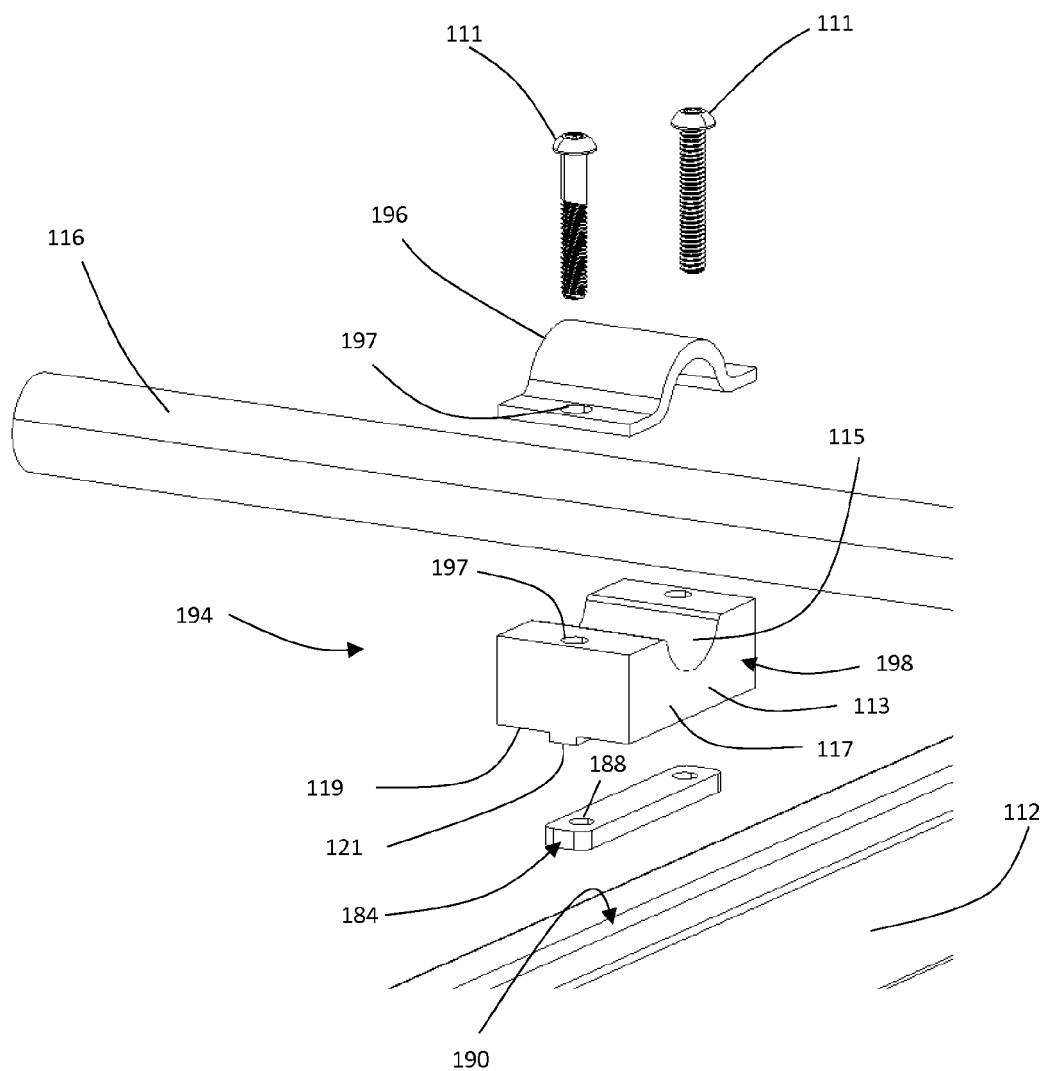
FIG. 14 is an exploded view of a clamp assembly with carrying rail and horizontal rail.

A carrying rail 116 is adjustably affixed to horizontal rail 112. In this embodiment, a securing mechanism in the form of a clamp assembly 194 is utilized to serve as a mounting bracket to affix carrying rail 116 to horizontal rail 112. Clamp assembly 194 (FIG. 11) comprises a clamp cap 196, a clamp base 198, one or more clamp fastener 111, and upper track plate 184. Clamp base 198 (FIG. 14) comprises a clamp body 113 with a carry recess 115 extending through the sides of the body 113. The bottom 119 of clamp body 113 comprises an aligner here in the form of an elongated boss 121 sized to slide within track window 190 therein positioning clamp body 113 on horizontal rail 112. Clamp fasteners 111 extend through fastener apertures 197 in clamp cap 196 and clamp base 198, and into threaded clamp hole 188 in upper track plate 184. As clamp fasteners 111 are advanced, the heads of the fasteners draw the clamp cap 196 and the upper track plate 184 together therein clamping carrying rail 116 between clamp cap 196 and carry recess 115 to secure carrying rail 116 in a fixed position relative to both clamp assembly 194 and horizontal rail 112.

Support rail 120 in this embodiment comprises an assembly configured for mounting on the top side wall of the bed of a pick-up truck. In the embodiment illustrated in FIG. 11, the support rail 120 comprises an upper vise 123 and a lower vise 125. The upper vise 123 comprises lower track plate 186, the horizontal plate 129, and lower track fasteners 127. The lower vise 125 comprises the upper bed plate 131, the lower bed plate 133, bed fasteners 135, and bed nuts 137. The top surface of bed spacer 139 is joined to the bottom side of horizontal plate 129. Bottom surface of bed spacer 139 is joined to the top surface of upper bed plate 131. In this embodiment, this joining utilizes a weld bead 153 to secure the parts together however other methods such as fastening or machining the upper bed plate 131, lower bed plate 133, and bed spacer 139 from single body may be used. In alternative embodiments horizontal plate 129 may be secured directly into select locations on horizontal rail 112 by use of bolts or other attachment means. Preferably more than one support rail is used and may be referred to as first support rail, second support rail, etc.

Horizontal plate 129 may comprise one or more guides 141 for alignment between the parts and for securing horizontal rail 112. This embodiment (FIG. 11) comprises a pair of opposing guides 141 which cradle the outer walls of horizontal rail 112.

Figure 10:
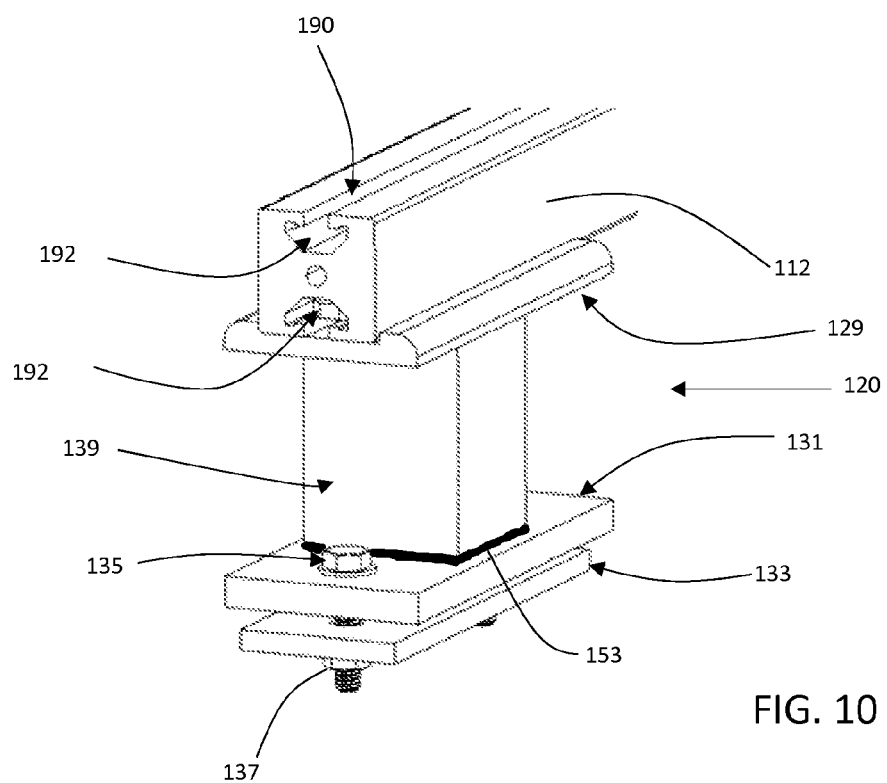
FIG. 10 is a close-up perspective view illustrating an alternative profile of a horizontal rail and an alternative support rail illustrated in FIG. 9.

Bed apertures 136 are aligned through the upper bed plate 131 and lower bed plate 133 and are sized to house bed fasteners 135 (FIG. 10, 11). Complementary apertures through the top side wall of the truck bed (not shown) provides for securing the bed's top side wall between the upper bed plate 131 and lower bed plate 133. Thus, by advancing bed fasteners 135 into bed nuts 137 the plates 131 and 133 work as a vise to secure the top side wall of the truck bed therebetween. In some embodiments one or more layers of plastic or other protective material may be used between the truck bed and bed plates to protect one or more painted surfaces of the truck bed. In alternative embodiments bed apertures 136 in the bed plate may be threaded therein eliminating the necessity for bed nut 137.

Upper vise 123 may be slid to infinite positions along lower track 182 and locked into position by tightening of lower track fasteners 127 in lower track plate 186. This adjustment feature provides for rack 110 to be mounted at various positions on the top side wall of the truck bed to best serve the needs and preferences of the user.

Figure 27A:
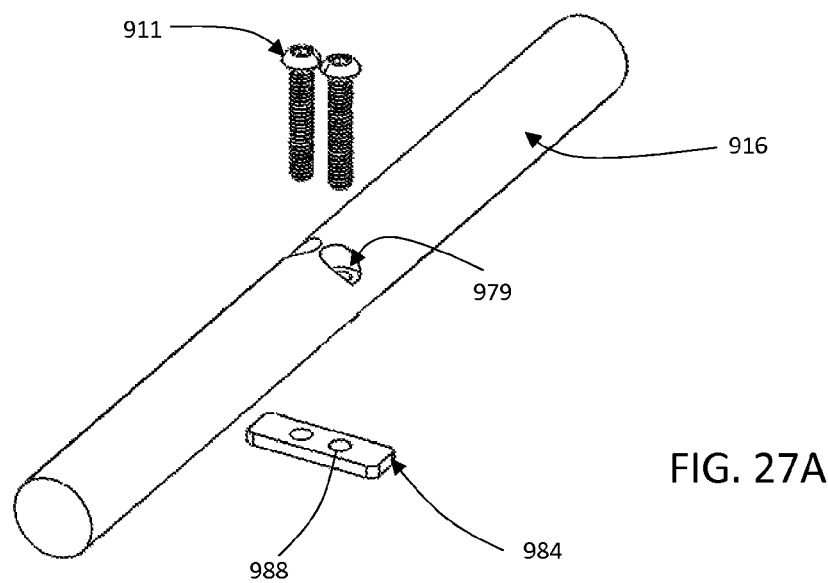
FIG. 27A is a perspective exploded view of one embodiment of a carrying rail configured to be mounted directly to a horizontal rail without use of an intermediate clamp assembly.
Figure 27B:
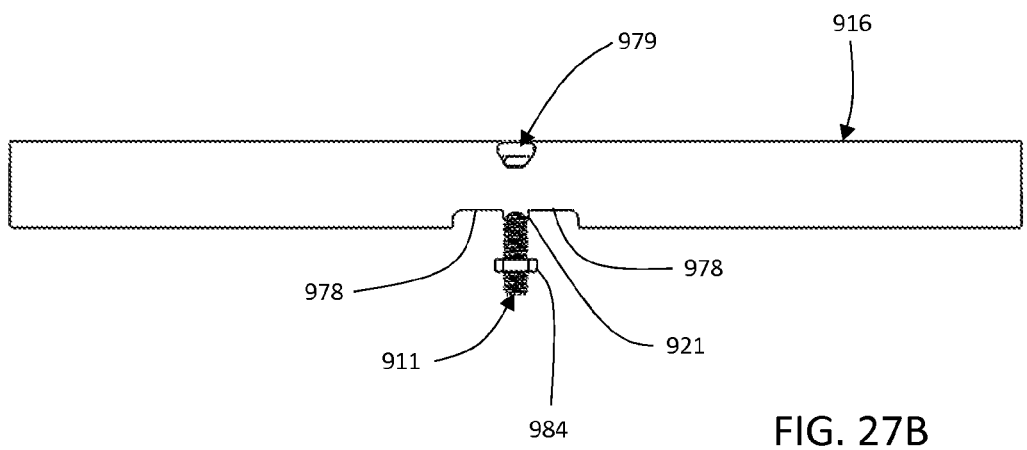
FIG. 27B is a front view of the carrying rail of FIG. 27A.

An alternative embodiment of a carrying rail 916 is illustrated in FIG. 27A-27B. As noted in FIG. 9, the carrying rail 116 may be secured to the horizontal rail 112 by way of an intermediate clamp assembly 194. Carrying rail 916 however, comprises features which enable the rail 916 to be directly secured to a horizontal rail. Here the carrying rail 916 is in the form of a solid rail with two countersunk rail holes 979 extending through the rail for housing one or more rail fasteners 911. The countersunk rail holes 979 align with threaded track plate holes 988 that extend through track plate 984 which resides in the track passage of the horizontal rail. Profile recesses 978 complement the outer shape of horizontal rail 912 and assist carrying rail 916 in seating on the horizontal rail. An aligner here in the form of an elongated boss 921 seats in the track passage of the horizontal rail to also keep carrying rail 116 aligned with the horizon rail.

Figure 11:
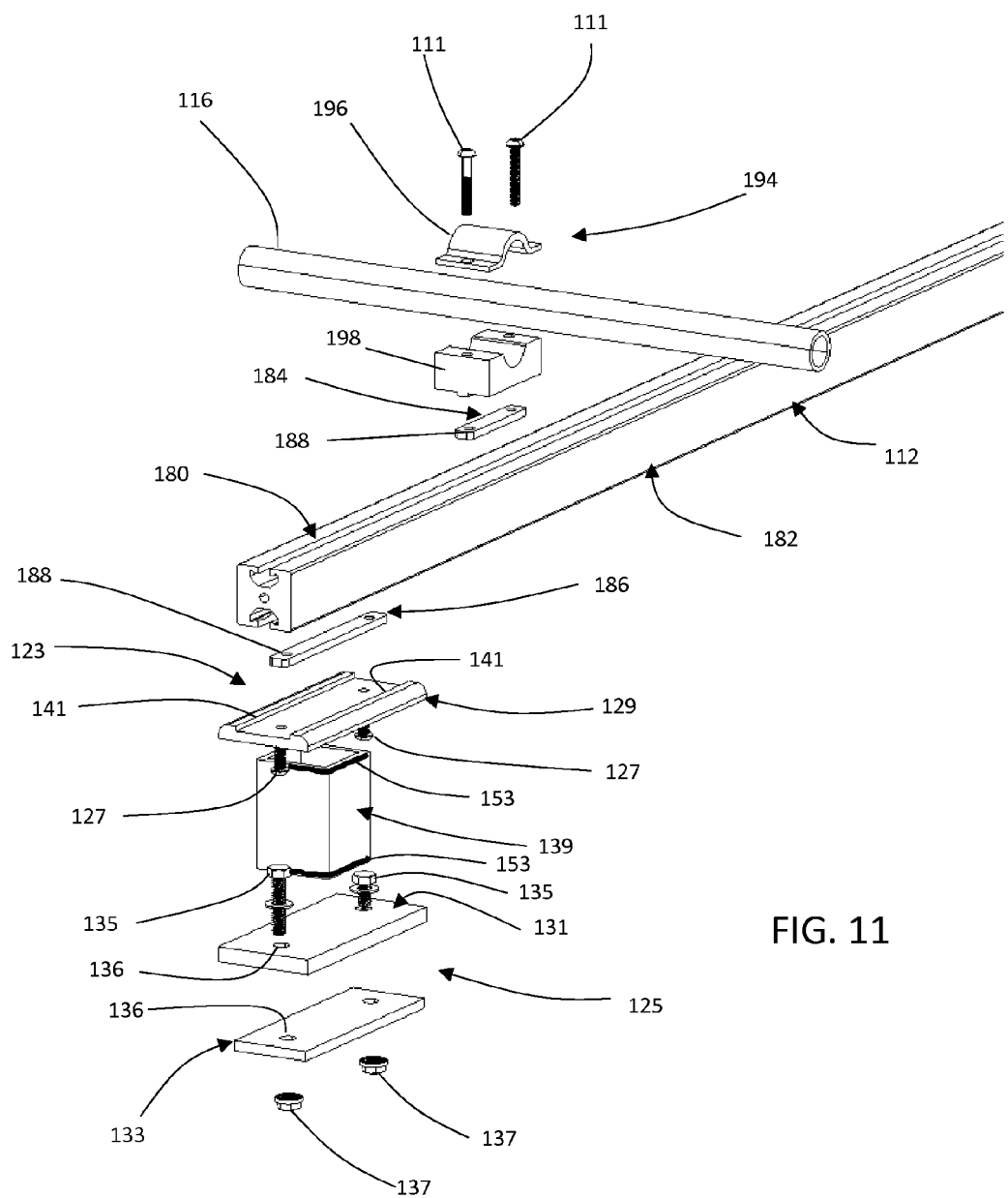
FIG. 11 is an exploded top perspective view of a portion of the rack illustrated in FIG. 9.
Figure 12:
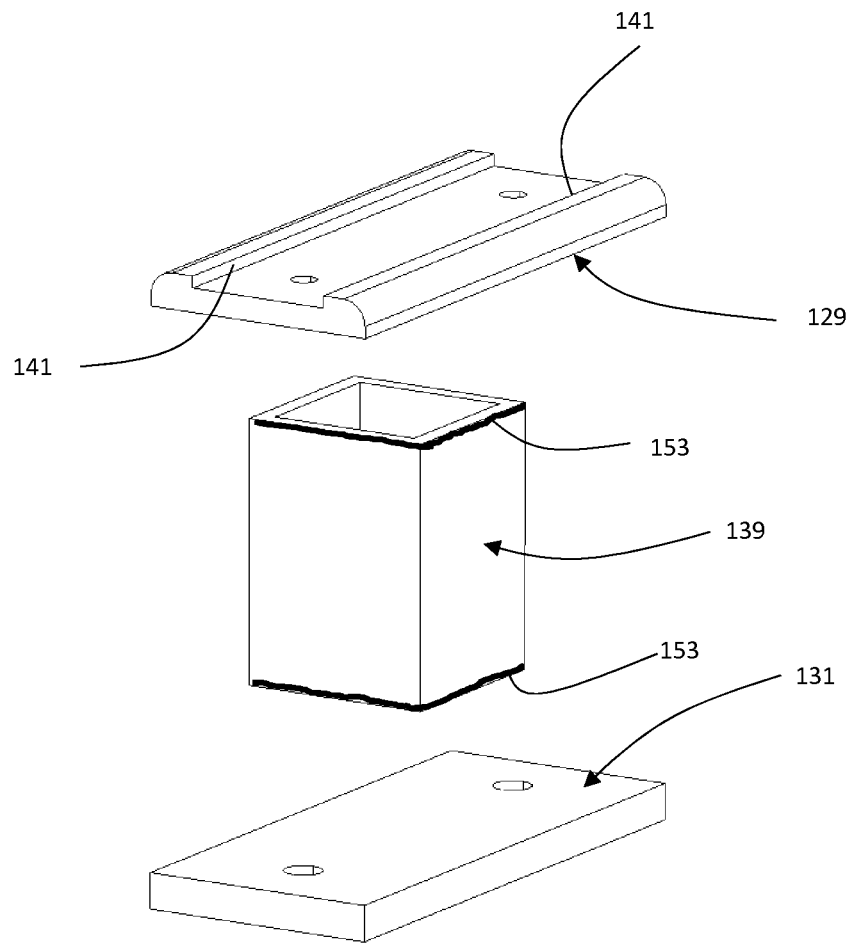
FIG. 12 is an exploded top perspective view of the upper portion of the support rail illustrated in FIG. 9
Figure 13A:
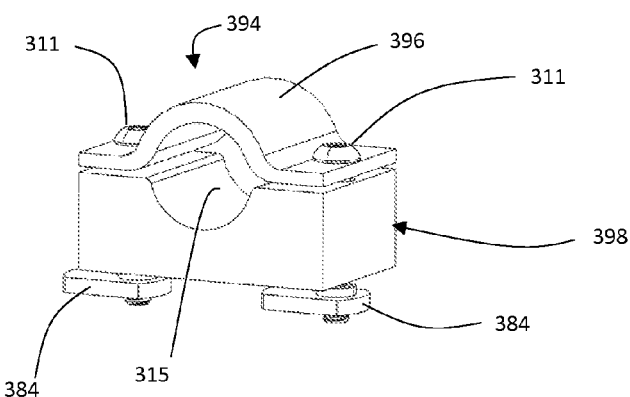
FIG. 13A is a perspective view of the alternative clamp assembly used on the rack illustrated in FIG. 9.
Figure 13B:
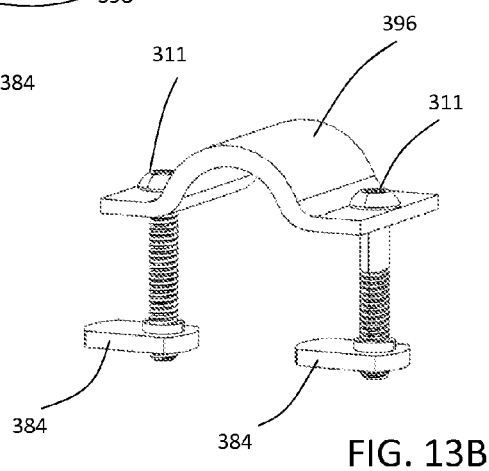
FIG. 13B is a perspective view of the clamp assembly of FIG. 13A with the clamp base removed.
Figure 13C:
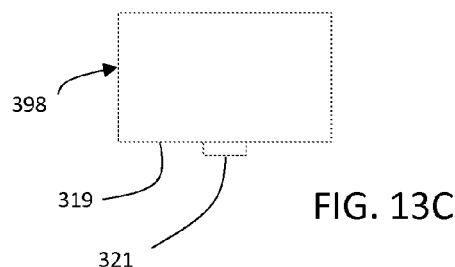
FIG. 13C is an end view of the clamp base illustrated in FIG. 13A.
Figure 13D:
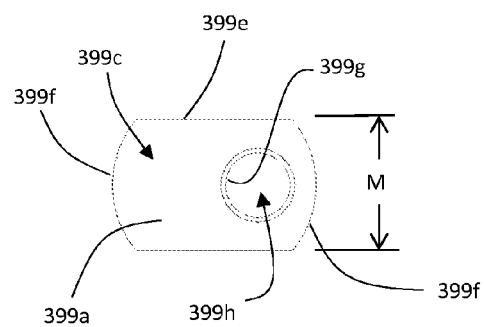
FIG. 13D is a top view of the track tab illustrated in FIG. 13A.
Figure 13E:
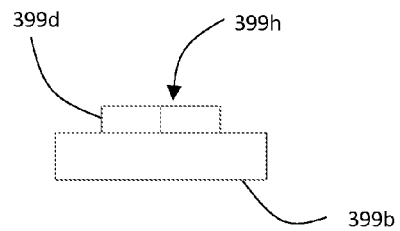
FIG. 13E is a side view of the track tab illustrated in FIG. 13A.
Figure 15:
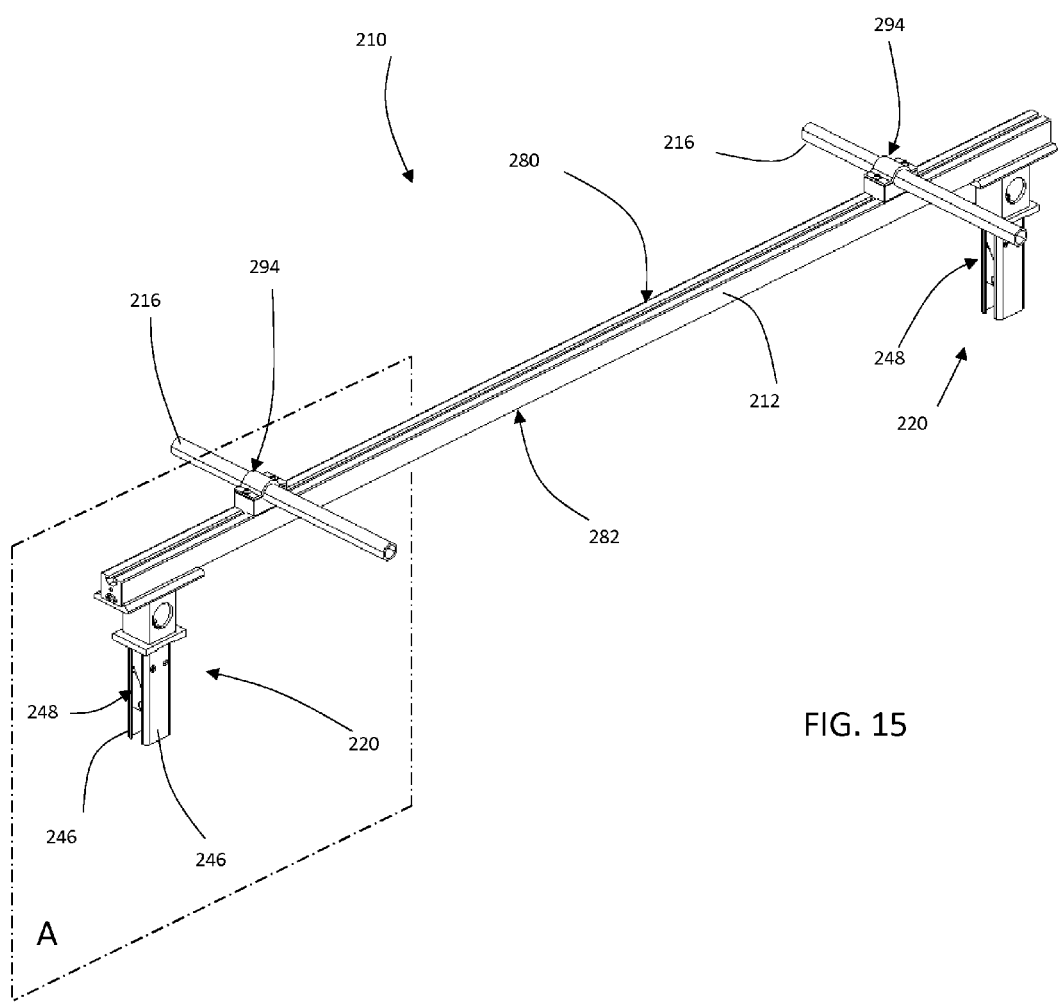
FIG. 15 is a top perspective view of another alternative embodiment of a rack with an expandable style support rail.
Figure 16:
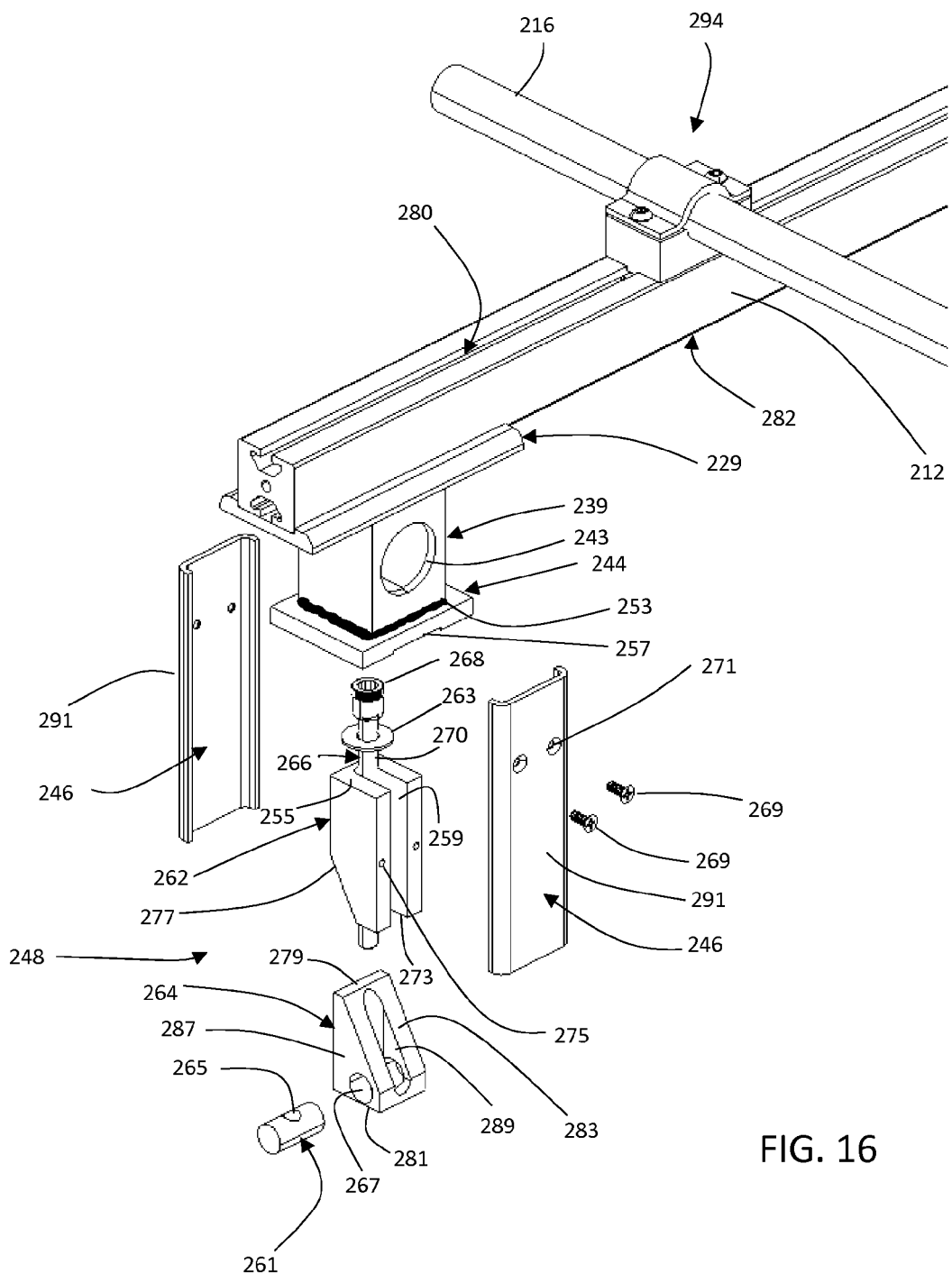
FIG. 16 is an exploded view of the expandable support rail from the rack illustrated in FIG. 15.

FIG. 15 illustrates an alternative embodiment of the open side wall mount rack 210. Parts in this embodiment duplicate those used in the embodiment illustrated in FIG. 9 except for support rail 220. The pocket insert portion of support rail 220 is configured to extend into, expand, and lock within the pocket hole of a truck bed by physical expansion of portions of the support rail 220. Support rail 220 (FIG. 16) comprises a pair of opposing shims 246, lower wedge 264, upper wedge 262, barrel 261, mounting bolt 266, washer 263, shim fasteners 269, bed spacer 239, rim base 244, and horizontal plate 229. Although the lower track plate and lower track fasteners are not shown in FIG. 16, a similar upper vise assembly as illustrated in FIG. 11 exists between horizontal plate 229 and horizontal rail 212 for locking the support rail 220 at a desired position along horizontal rail 212. This feature provides for adjusting the distance between support rails 220 for proper fit into two unilateral pocket holes of a truck bed.

Figure 17:
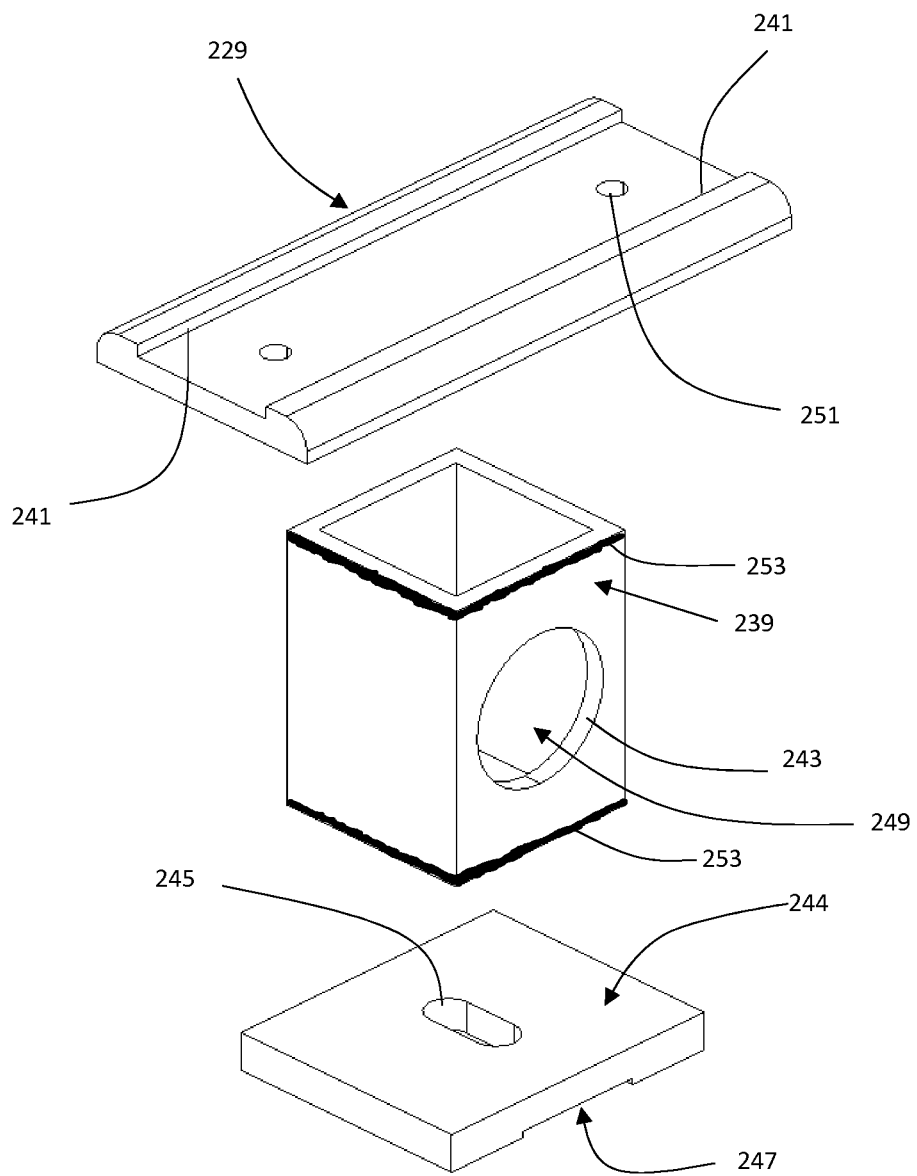
FIG. 17 is an exploded perspective view of the upper portion of the support rail illustrated in FIG. 15.

In this embodiment (FIG. 15-17), rim base 244 comprises a generally centered slot 245 (FIG. 17) sized to pass the mounting bolt body 270 of mounting bolt 266, and with mounting bolt head 268 and mounting bolt washer 263 seated on top surface of rim base 244. The slot 245 provides a adjustment of the bolt to improve the fit of the support rail in the pocket holes. The bottom side of the rim base 244 comprises an expander positioner here in the form of an elongated recess 247 for capturing the superior face 249 of the upper wedge 262 therein limiting motion between these parts.

The bed spacer 239 in this embodiment comprises an access wall 243 defining an access hole 249 sufficient to pass the head of a wrench such as an Allen wrench for advancing the mounting bolt head 268 of mounting bolt 266. Horizontal plate 229 comprises one or more guides 241 for positioning the horizontal rail 212 in parallel alignment with plate 229. One or more fastener walls 251 extend between the top and bottom surface of the horizontal plate 229 and define lower track fastener holes which are sized to pass the lower track fasteners. In preferred embodiments a weld bead 253 is utilized to join the top surface of bed spacer 239 with the bottom surface of horizontal plate 229 and another weld bead 253 to join the bottom surface of bed spacer 239 with the top surface of rim base 244. Horizontal plate 229 may comprise an entry wall defining a mounting bolt entry aperture (not shown) sized to pass mounting bolt 266 therethrough.

The wedge system 248, includes upper wedge 262 (FIG. 16) comprising an upper wedge face 255 that stabilizes against a bottom surface of rim base 244 and may be seated within expander positioner 257. Here the expander positioner 257 is in the form of an elongated groove having opposing side walls to contain upper wedge 262.

The upper wedge body comprises an elongated upper shaft face 259 defining an upper shaft aperture sized to pass the mounting bolt 266 body from an upper wedge face 255 to a lower wedge face 273 while also providing for the upper wedge 262 to move laterally or medially during advancement or loosening of mounting bolt 266. On a side of upper wedge 262 are one or more threaded wedge retaining holes 275 sized to house the threaded shafts of shim fastener 269 for securing one of the shims 246 to the upper wedge 262. Angled from one side of wedge 262 to a lower wedge face 273 is upper friction face 277.

The lower wedge 264 comprises a body with a upper wedge wall 279, a lower wedge wall 281, side walls 287, a barrel wall 267 defining a barrel aperture extending at least partially through the side walls 287. The barrel aperture is sized to hold and provide for pivoting of barrel 261 therein. The lower wedge 264 comprises a lower shaft face 289 defining an elongated lower shaft aperture sized to pass the mounting bolt body from a position near the upper wedge wall 279 to a position near the lower wedge wall 281. The lower shaft aperture also provides clearance for pivoting of the lower wedge 264. Angled from one side of the wedge 264 towards the upper wedge wall 279 is lower friction face 283. On a side of the lower wedge are one or more threaded wedge retaining holes (not shown) sized to house the threaded shafts of shim fastener 269 (not shown on opposing side) for securing one of the shims 246 to the lower wedge 264.

Upon assembly, the mounting bolt head 268 of the mounting bolt 266 is seated against the washer 263 and top surface of rim base 244 with the mounting bolt body extending through the centered slot 245 of base 244, through the upper shaft aperture of the upper wedge 262, through the lower shaft aperture of the lower wedge 264, and threaded into the barrel hole 265 of barrel 261.

Using a tool through the access hole 249 of the bed spacer to advance mounting bolt 266 causes the barrel 261 to advance up the mounting bolt shaft in turn causing the frictional faces 277, 283 of the upper wedge 262 and lower wedge 264 to be driven against each other and driving each other laterally or to pivot about the barrel 261. As a result, the distance between the opposing shim faces 291 increases until reaching the full width of the pocket hole therein securing the support rail within. Derotating the mounting bolt 266 drives the barrel 261 distally down the mounting bolt shaft body 270 therein providing a reduced lateral distance between the opposing shims 246 for removal purposes from the pocket hole 30. A biasing member such as a spring may be used to assist in retracting shims together for eased removal purposes from pocket holes. Each shim may be coated with a cushioner (not shown) such as paint, plastic, rubber or other cushioning material to prevent damage to the internal surfaces of the trucks pocket hole. Similarly, a cushioning material may be used on at least a portion of the bottom surface of the rim base facing the truck's bed.

Figure 18:
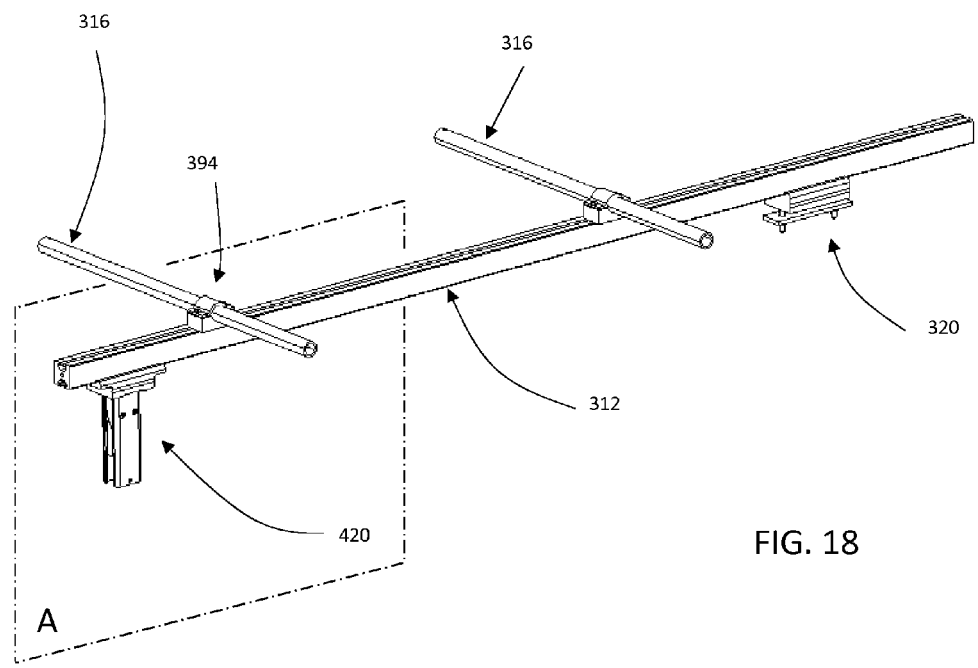
FIG. 18 is a top perspective view of a rack illustrated with an alternative expandable support rail and an alternative bolt-on style support rail.

In preferred embodiments, the horizontal rail, support rails, and clamp assembly are generally aligned within a vertical plane. This plane is illustrated for example as 'A' in FIGS. 15, 18, and 25D. FIG. 18 illustrates yet another embodiment of a rack system with alternative embodiments of support rails 320, 420 and clamp assembly 394. Most rack applications will use support rails of the same type although various styles may be mixed depending on the application desired. Illustrated in FIGS. 19A-19D, support rail 320 comprises a unitary body in the form of a fixed spacer block 393. Whereas support rail 120 (FIG. 11) comprises a welded assembly of a horizontal plate 129, bed spacer 139, and upper bed plate 131; spacer block 393 performs a similar function but is manufactured as a unitary element. At the top surface of spacer block 393 is one or more guides 341 for capturing and aligning horizontal rail 312. In this embodiment, said guides are in the form of opposing guide walls 341 that rise up above the spacer block 393 to form a capture tunnel 395*e* to seat the outer surface of horizontal rail 312. Extending and aligned through spacer block 393 and lower bed plate 333 are one or more fastener walls 351 defining an aperture sized for housing threaded studs 335. Adjacent the lower surface of bed plate 333 is washer and bed nut assembly 337. The bed nut threadably engages a lower end of stud 335. A track tab 384 threadably engages the upper end of stud 335. Like the track plates described previously, the track tab 384 resides within the track passage of the horizontal rail. Advancing the bed nut 337 on stud 335 concurrently secures the horizontal rail 312 to fixed spacer block 393 and clamps a portion of the truck bed between the fixed spacer block 393 and lower bed plate 333.

Spacer block 393 may comprise grooves or other decorative insignia 395*d* to enhance the aesthetics or serve as a source identifier for the device when in the form of a logo or company name. Spacer block 393 may assume a variety of shapes suitable for creating a space between a horizontal rail and a truck bed and for securing said horizontal rail to said truck bed. In preferred forms, said spacer block 393 is in the form of a rectangle having a profile suitable for extrusion with minimal post machining of holes or other features and comprises one or more block side surfaces 395*a* spanning between a top block surface 395*b* for adjoining the horizontal rail and a bottom block surface 395*c* of block 393 for clamping adjacent a truck bed.

A preferred clamp assembly 394 embodiment is illustrated in FIG. 13A-13E and comprises features illustrated previously in FIGS. 9, 11 and 14. Clamp assembly 394 utilizes one or more track tabs 384 rather than a track plate 184,186 to secure the assembly 394 with the horizontal rail. Track tab 384 comprises a track top surface 399*a*, a track bottom surface 399*b*, a track foot 399*c*, a track collar 399*d*, opposing lateral walls 399*e*, opposing end walls 399*f*, and a central tab wall 399*g* defining a threaded aperture 399*h* configured to receive clamp fastener 311. The outer surface of track collar 399*d* is sized to slidingly move between opposing walls in track window 190 whereas opposing lateral wall 399*e* are separated by a distance 'M' to slidingly move within track passage 392 before tightening wherein the distance 'M' is too great to pull through track window 390.

Illustrated in FIGS. 20A and 20B is an alternative embodiment for a support rail 420. The lower portion of the rail comprises many of the same features as the support rail illustrated in FIGS. 15 and 16 as noted by the corresponding feature numbers separated by 200. The upper portion of support rail 220 is made from an assembly of parts namely horizontal plate 229, bed spacer 239, and rim base 244 joined in by a plurality of weld beads 253. These welded parts are replaced in support rail 420 by pocket spacer block 493. Unique features of spacer block 493 include a head recess 497*a* sufficient in size and depth to contain the mounting bolt head 468 of mounting bolt 466 and washer. Extending through head recess 497*a* is shaft hole 497*b* sufficient in size to pass the shaft portion of mounting bolt 466 while restricting the passage of head 468. In this embodiment, shaft hole 497*b* is in the form of a slot to provide lateral movement of the mounting bolt during insertion of the support rail 420 into the pocket hole and during tightening. Further, pocket spacer block 493 comprises a pair of wings 497*c* extending from opposing ends of block 493. Alternatively, wings 497*c* may be absent and countersunk recesses may be utilized to dispose track fastener 427 in bottom surface of spacer block 493. Extending between a top block surface 495*b* and bottom surface of the wing 497*c* is fastener wall 451 defining apertures configured to pass the shaft of track fastener 427 as they extend up and thread into track tab 484. As described in other embodiments, advancement of track fastener 427 causes track tab 484 to lock spacer block 493 to the horizontal rail 412. The head of track fastener 427 and other fasteners in the system may be configured to require a special tool to loosen to help prevent theft of the rack or merchandise attached to it. At the bottom of block 493 is wedge recess 497*d* configured to capture the top edges of upper wedge 462 to assist alignment of block 493 over wedge 462.

FIGS. 22A-24B illustrates an alternative embodiment of a carrying rail. In this embodiment, the carrying rail is part of an elevating carrying rail linkage mechanism 500 for adjustably raising and lowering the carrying rail in cases where an elevated carrying rail is needed to clear the bed cover of a pickup truck. The mechanism 500 in this embodiment comprises a U-shaped carrying rail 516 having a long leg 502 and short leg 504 of the U. The long leg 502 of the 'U' is generally elevated above the short leg 504 and is configured in length to sufficiently support rack add-ons such as utility carrier 506 illustrated in FIG. 22*a* which is commonly used for storing groceries, suitcases, recreational equipment, and other goods when additional space is needed during transportation. One or more utility clamps 534 grasp about the outer surface of the long leg 502 of carrying rail 516 to hold the carrier 506 to the rack. The short leg 504 is of sufficient length to be captured within a clamp assembly 594 (FIG. 23A-B).

The carrying link mechanism 500 also comprises a pivot base 508. The lower portion of pivot base 508 (FIG. 24A-B) comprises several features described in prior clamp assemblies including; a track positioner in the form of an elongated boss 521 to position the pivot base within the upper track 580 of horizontal rail 512, and fastener apertures 597 configured to house one or more clamp fastener 511. The upper portion of pivot base 508 comprises a capture illustrated here in the form of a pair of spaced barrel retainers 518. A capture wall 520 within the barrel retainers defines a pivot aperture 522 sized for holding pivot barrel 514 while permitting free rotation of the barrel therein along the cylindrical axis of the barrel. Rod recess wall 524 defines a rod recess aperture 526 which in this embodiment is threaded. A lower end 528 of pivot rod 510 is secured in the rod access aperture 526 by complementary threads, pins, or other mechanical means. The upper end 530 of pivot rod 510 comprises a carry pivot for pivoting the pivot bar 510 about the long leg 502. The carry pivot is illustrated here in the form of a pivot ring 530 having a ring inner wall 532 defining a ring aperture 534 sized to pivot about the long leg 502.

Figure 23A:
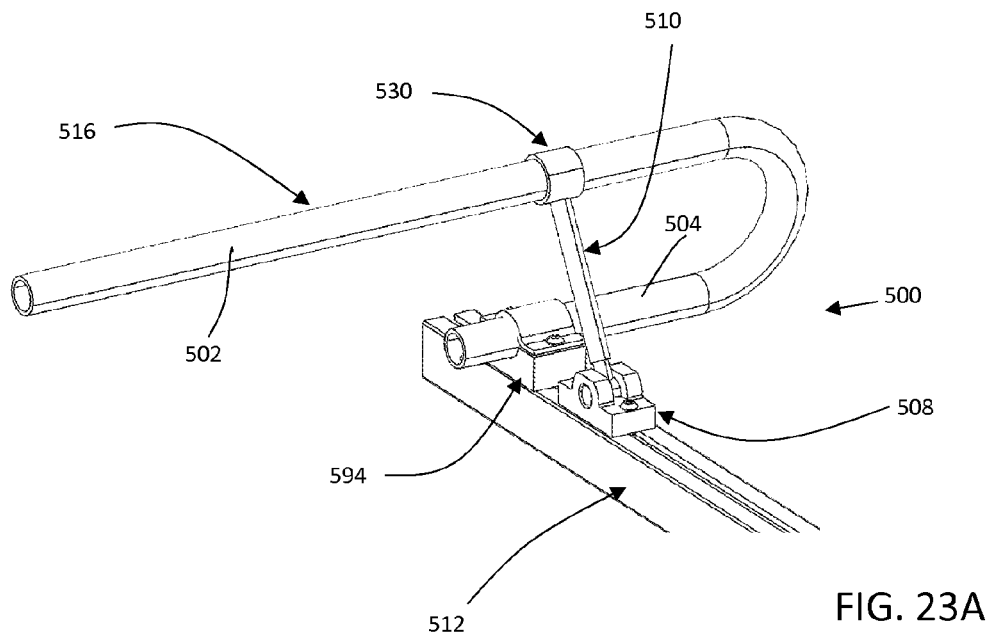
FIG. 23A is a perspective view of a preferred embodiment of an adjustable carrying bar assembly in an upright position.
Figure 23B:
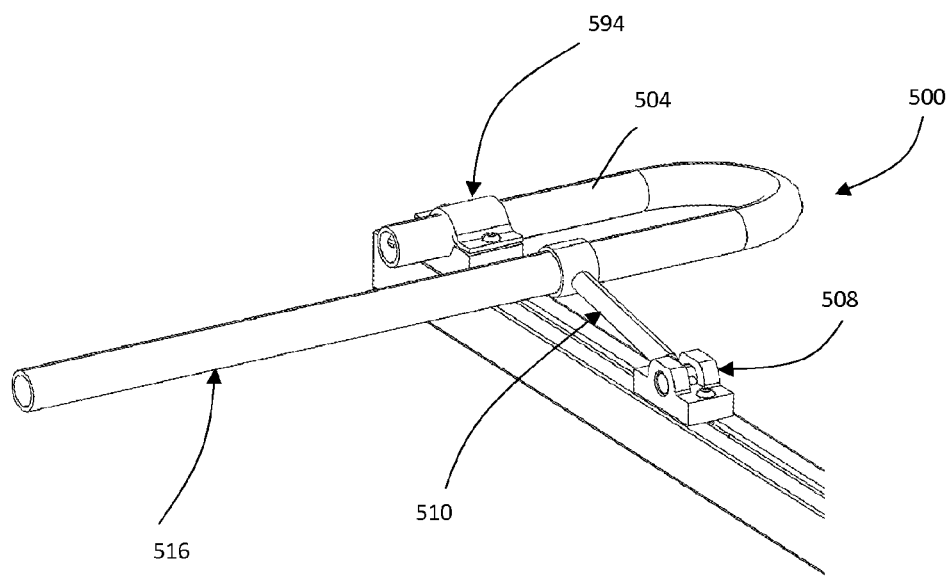
FIG. 23B is a perspective view of a preferred embodiment of an adjustable carrying bar assembly in a lowered position.
Figure 23C:
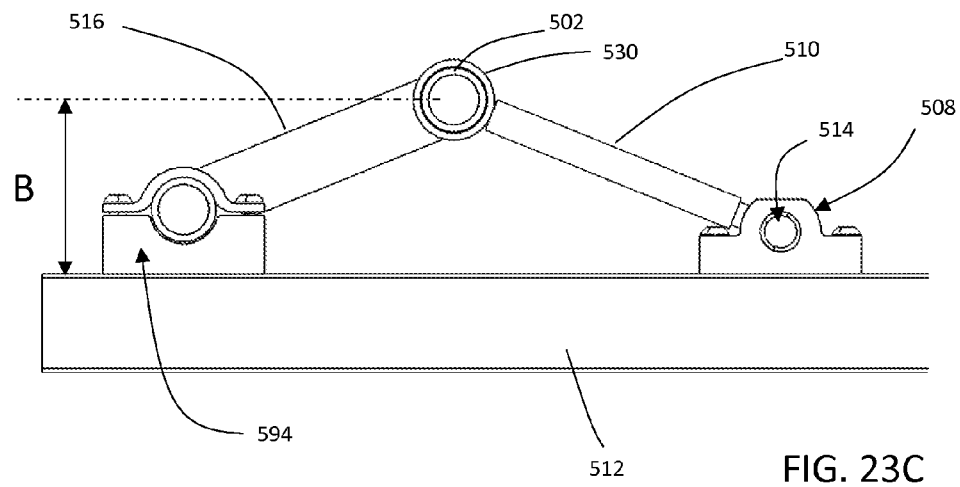
FIG. 23C is a side view of an adjustable carrying bar assembly in a lowered position.
Figure 23D:
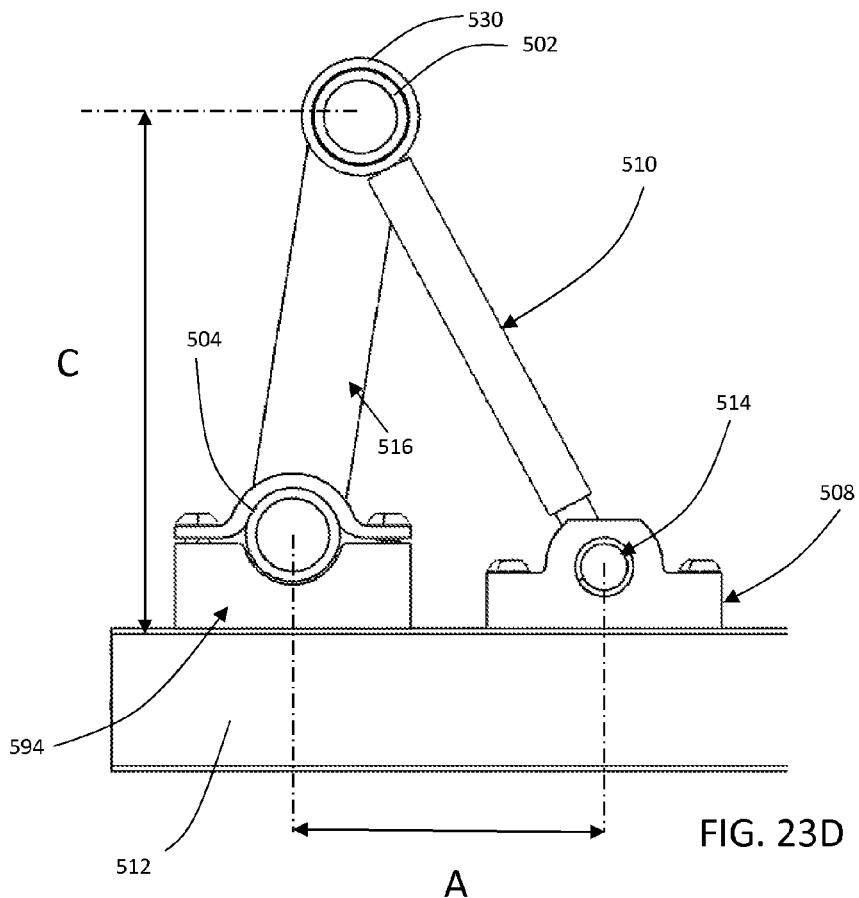
FIG. 23D is a side view of an adjustable carrying bar assembly in an upright position.
Figure 24A:
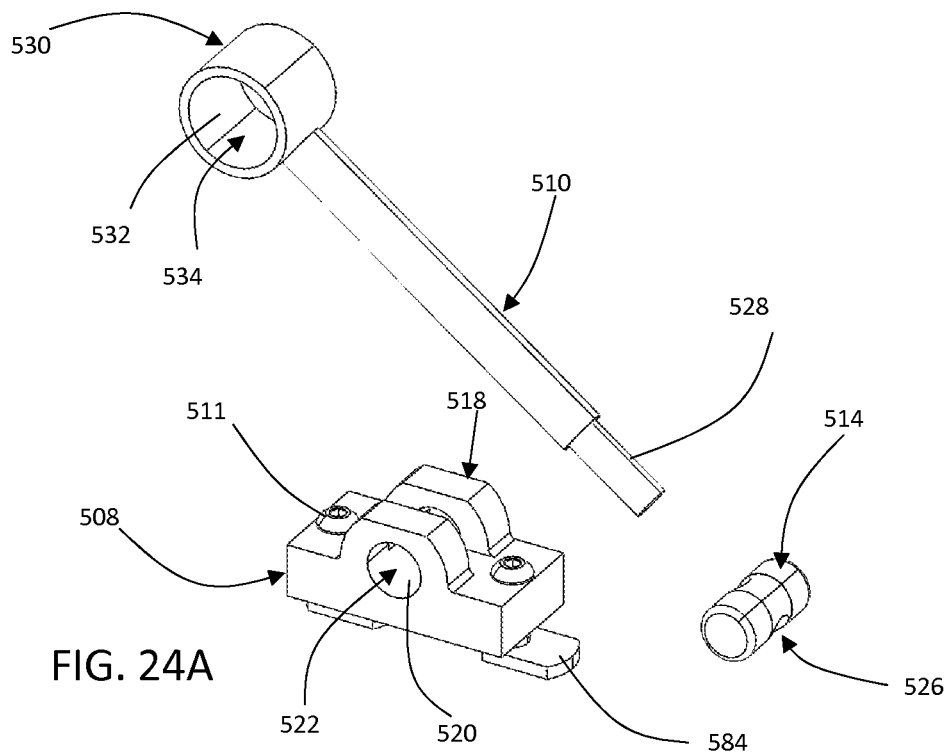
FIG. 24A is a top perspective exploded view of the pivot control portion of the adjustable carrying bar assembly illustrated in FIG. 23A.
Figure 24B:
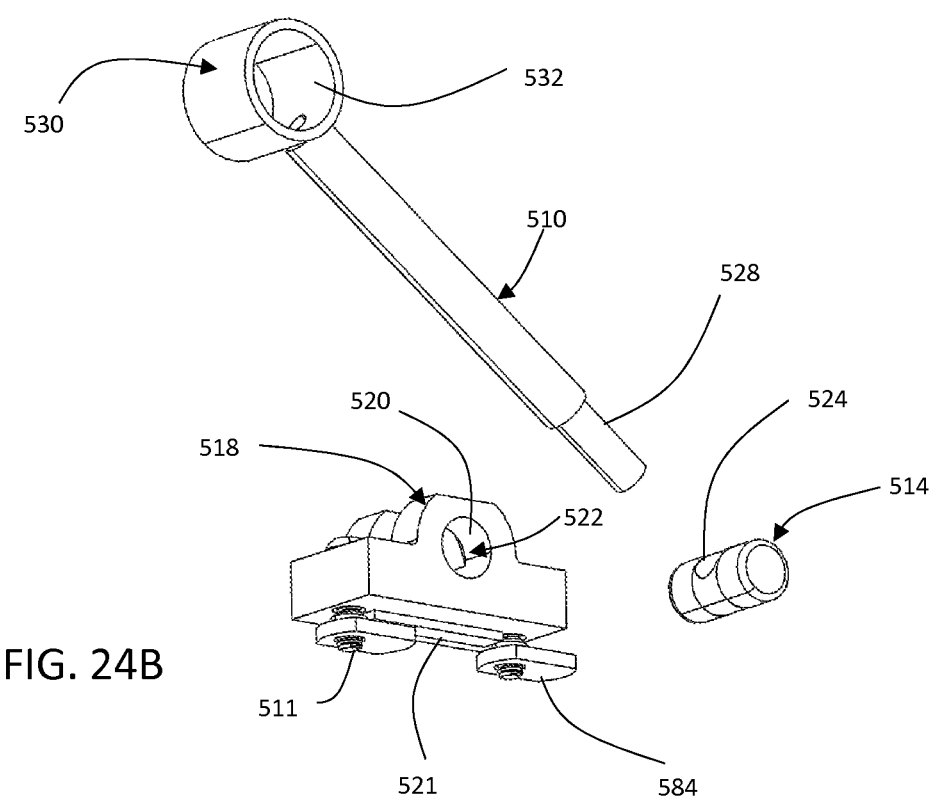
FIG. 24B is a bottom perspective exploded view of the pivot control portion of the adjustable carrying bar assembly illustrated in FIG. 23A.

The pivot base 508 and clamp assembly 594 are adjustable along and lockable on the upper track 580 of the horizontal rail 512. Each are secured by advancement of clamp fastener 511 into one or more track tabs 584 as described earlier for the embodiment in FIG. 13B. One end of a pivot rod 510 with pivot barrel 514 is captured within the pivot base 508 and pivotable within pivot aperture 522. The upper end 530 of the pivot rod 510 articulates about the long axis of the long leg 502 of the generally U-shaped carrying rail 516. Shortening distance 'A' between the pivot base 508 and the clamp assembly 594 on the upper track of the horizontal rail causes the long leg 502 to assume a heightened position 'C' as illustrated in FIG. 23 D. Lengthening distance 'A' between the pivot base 508 and the clamp assembly 594 causes the long leg 502 to assume a lowered position 'B' as illustrated in FIG. 23C.

Figure 21A:
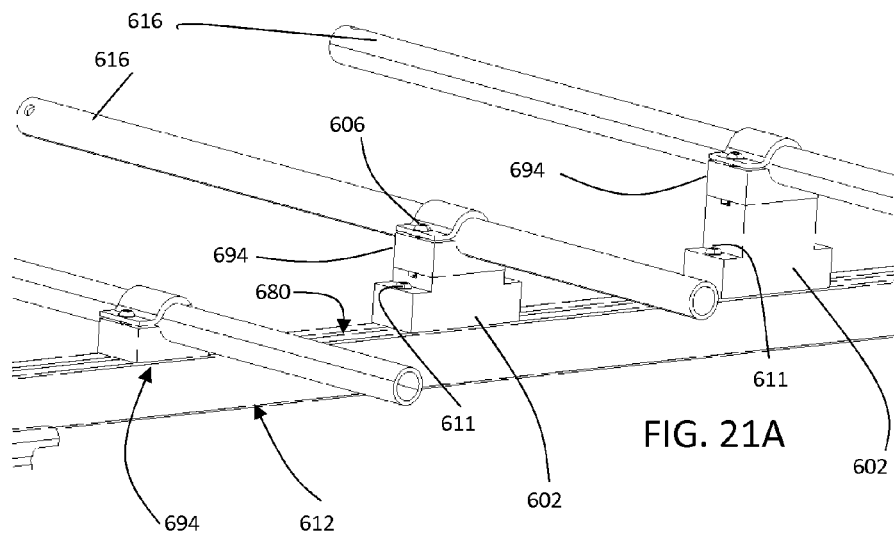
FIG. 21A is a top perspective view of a clamp assembly at a standard height and at two additional elevated heights.
Figure 21B:
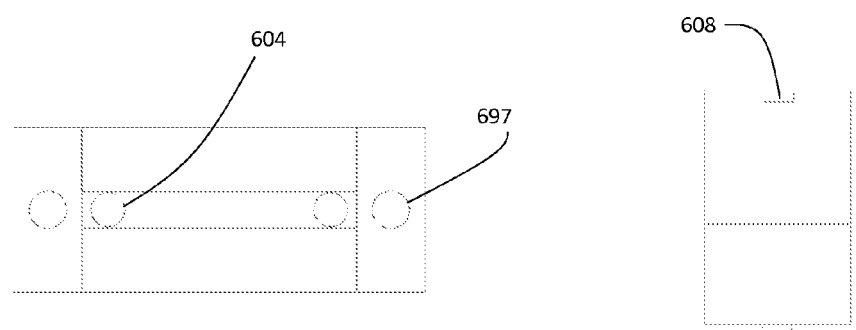
FIG. 21B is a top view of the elevator block illustrated in FIG. 21A.
Figure 21C:
FIG. 21C is an end view of the elevator block illustrated in FIG. 21A.
Figure 21D:
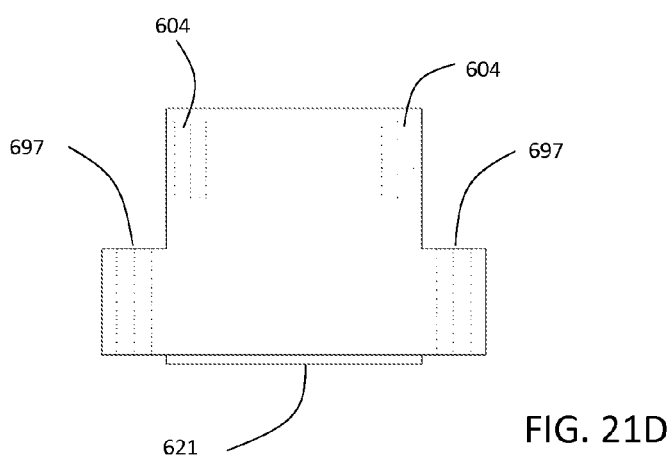
FIG. 21D is a front view of the elevator block illustrated in FIG. 21A.
Figure 22A:
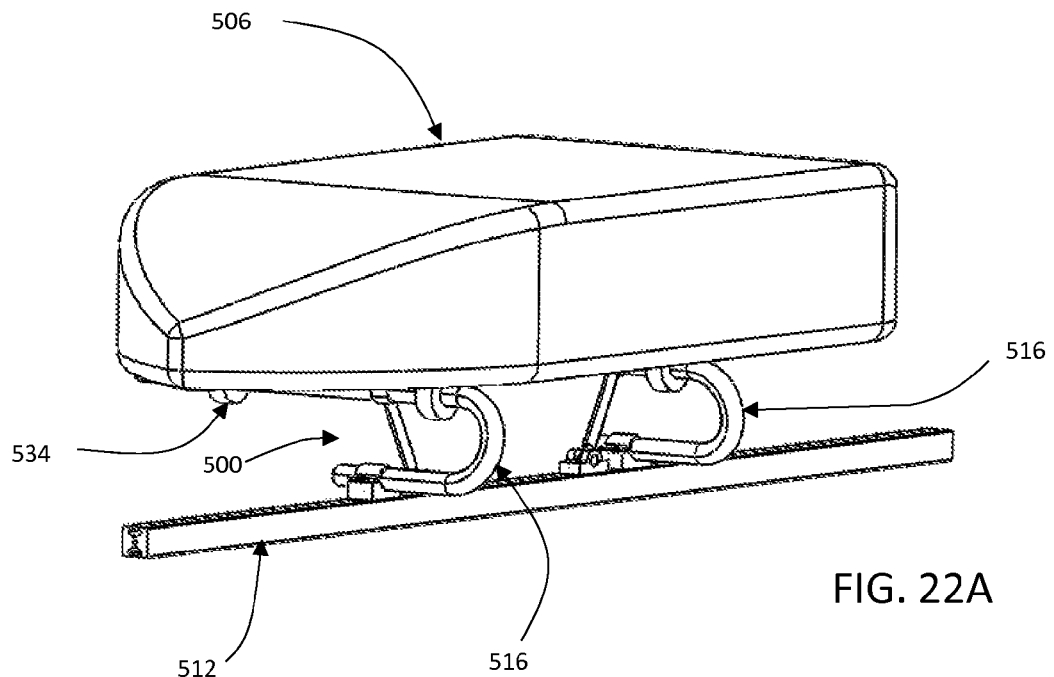
FIG. 22A is a top perspective view of a cargo box mounted to a preferred embodiment of an adjustable bar assembly.
Figure 22B:
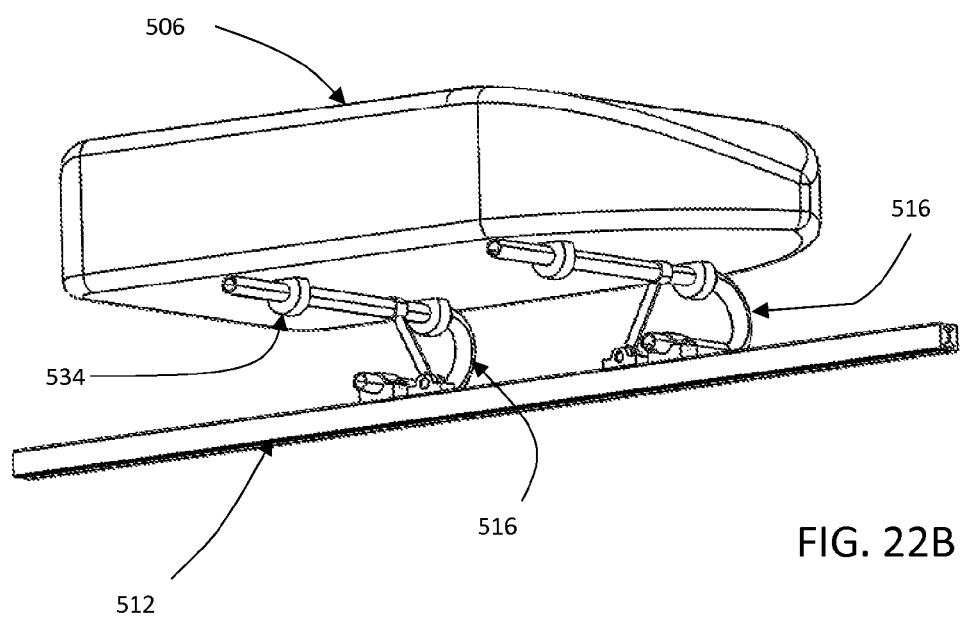
FIG. 22B is a bottom perspective view of a cargo box mounted to a preferred embodiment of an adjustable bar assembly.
Figure 22C:
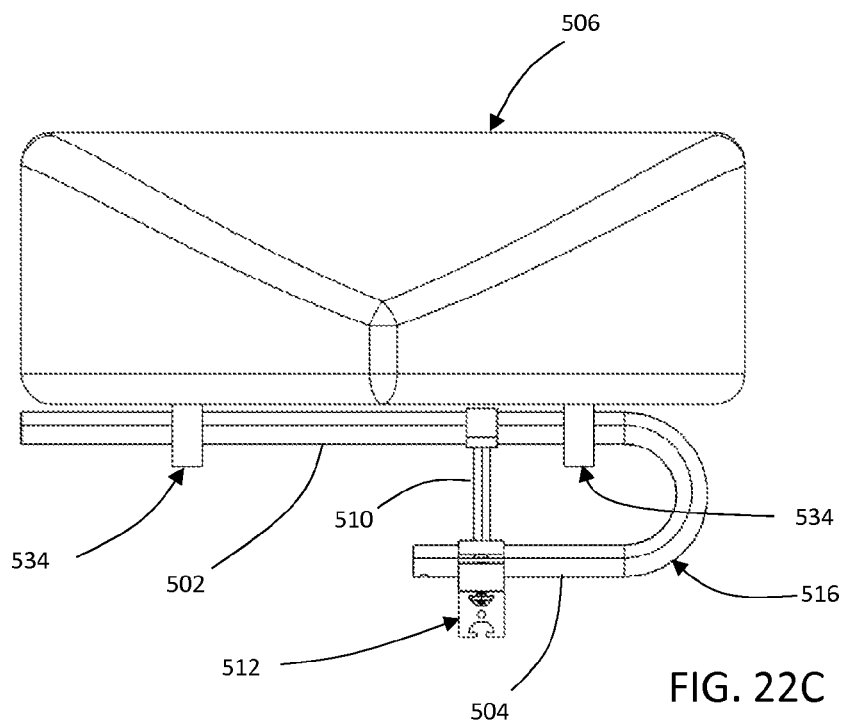
FIG. 22C is an end view of a cargo box mounted to a preferred embodiment of an adjustable bar assembly.
Figure 22D:
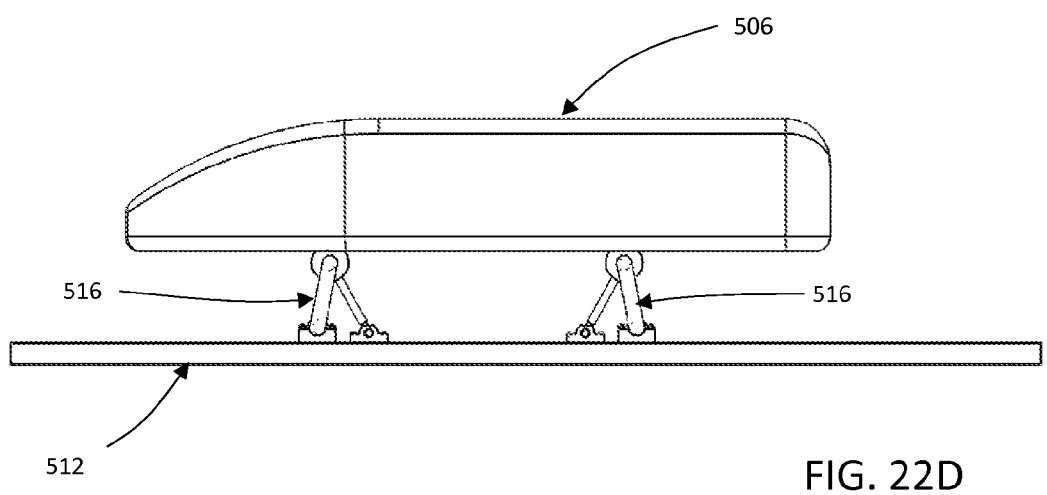
FIG. 22D is a side view of a cargo box mounted to a preferred embodiment of an adjustable bar assembly.

Other methods may be implemented to raise the functional height of the carrying rails other than the elevating carrying rail linkage mechanism described earlier. For example, illustrated in FIGS. 21A through 21D is a clamp assembly 694 utilizing an elevator block between the clamp assembly 694 and horizontal rail 612 therein causing an increased distance between the carrying rail and horizontal rail 612. The elevator block 602 may be manufactured in a variety of heights as illustrated in FIG. 21A. Illustrated on the left in the Figure is a clamp assembly 694 secured directly on carrying rail 612. Illustrated in the middle is a lower height elevator block 602 mated between a clamp assembly 694 and horizontal rail 612. Illustrated on the right is a higher height elevator block 602 mated between a clamp assembly 694 and horizontal rail 612. The elevator block 602 comprises a track positioner in the form of an elongated boss 621 to position the elevator block 602 within the upper track 680 of horizontal rail 612. Lower fastener apertures 697 are configured to house one or more track fasteners 611 that extend to a track tab (not shown, see earlier description) for locking the elevator block 602 to horizontal rail 612 when track fasteners 611 are advanced. Upper fastener apertures 604 are threaded in this embodiment and receive carry fasteners 606 for securing clamp assembly 694 to elevator block 602. At the top of elevator block 602 is receiver 608 configured with similar dimension and shape to the gap in the upper track of the horizontal rail 612 to house the track positioner of clamp assembly 694.

Figure 25D:
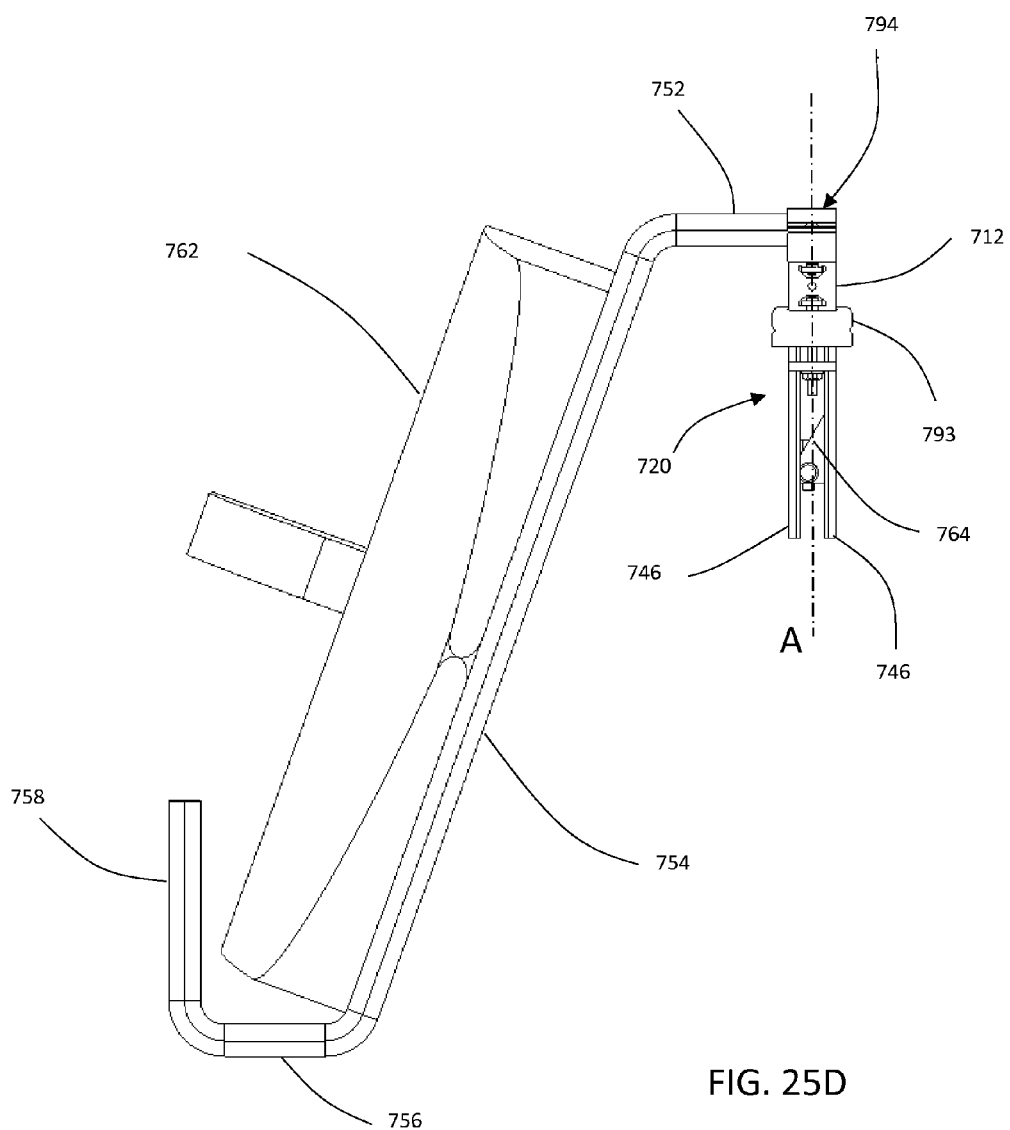
FIG. 25D is an end view of the cradle assembly holding a surf board utilizing the extension cradle illustrated in FIG. 25A and utilizing an expandable spacer block.

The mount racks described herein are configured to serve as a base mount to a wide array of add-on support systems. For example, rack 710 includes a side rack 750 (FIG. 25A-25D) configured for fixation within the carry recesses of one or more clamp assembly 794. In this embodiment the side rack 750 is manufactured from a metal tube however other materials such as polymers may be used that have sufficient capacity to carry the load. The side rack 750 comprises a lateral extension 752 with size and shape to be received in clamp assembly 794. The lateral extension 752 may also serve to extend the side rack away from the side of the vehicle outside the truck bed. Beyond the lateral extension 752 is an angled rest portion 754 extending generally downward then terminating in a lift arm portion 756 for carrying a majority of the load placed on the side rack 750. The side rack 750 may include an upright safety arm portion 758 to hold the load within the rack. A combination of these rack portions may form a load cup 760 for surrounding a portion of the load during transport. In this embodiment the load is a surfboard 762 but could be any variety of other items such as planks or sheets of wood or a window frame. In some embodiments the outer surface of side rack 750 may be at least partially covered with a protectant (not shown) and may be for example in the form of a foam tubing or paint to prevent damage to the load or the rack. In addition, the rack may be configured with releasable straps or other load retainers to prevent loss or movement of any load held within the load cup. FIG. 25D illustrates a side rack 750 secured by clamp assembly 794, mounted to horizontal rail 712, and secured using pocket hole style support rails like those previously described in FIG. 20A-D.

In additional embodiments of this invention two or more racks may be placed on a truck at a time. The racks may be placed one on each side of the truck, multiple racks on both sides, or a combination thereof. When at least one rack is placed on each side of the vehicle the two may be connected across the bed. In another embodiment of the invention cargo of different varieties may be attached to the same rack or multiple racks on the same side.

A method of transporting cargo on an open bed vehicle consistent with this disclosure comprises the steps of; adjusting the distance between support rails to a predetermined distance, fixing a horizontal rail by at least two support rails to one top side wall of an open bed vehicle. Positioning then fixing a carrying rail having a length less than the width between two opposing side walls of an open bed truck to the horizontal rail and fixing cargo for transportation to the carrying rail. The fixing by at least two support rails step may include placing an expandable portion of said support rail in the pocket hole of the open bed truck, or clamping or bolting the support rail to the top side wall of an open bed vehicle.

Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001 0.001, 0.01 or 0.1 as appropriate. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A rack system for mounting on one side of an open bed vehicle for holding cargo comprising:
   a first horizontal rail for supporting loads,
   said first horizontal rail configured for placement above and generally aligned with an elongate top side wall of an open bed of a vehicle,
   a first track for positioning of devices attached to said first horizontal rail,
   a second track for positioning of devices attached to said first horizontal rail,
   said first track disposed on said first horizontal rail,
   said second track disposed on a bottom facing side of said first horizontal rail,
   a first support rail,
   a second support rail,
   said first support rail adjustably fixed along said second track on said first horizontal rail,
   said first support rail configured for fixation to one of: a) the a top side wall of the bed of an open bed vehicle, and b) a pocket hole extending from a top side wall of the bed of an open bed vehicle,
   said second support rail adjustably fixed along said second track on said first horizontal rail,
   said second support rail configured for fixation to one of: a) the a top side wall of the bed of an open bed vehicle, and b) a pocket hole extending through a top side wall of the bed of an open bed vehicle, wherein the space defined by the walls of the open bed are free from obstructions by said rack system,
   a first clamp assembly,
   said first clamp assembly adjustably fixed along said first track,
   said first clamp assembly comprising a carry recess securing a first carrying rail therein,
   wherein said first carrying rail is fully supported by said first horizontal rail and is generally horizontally orientated and generally perpendicular to said horizontal rail,
   and wherein said first horizontal rail, said first and second support rails, and said first clamp assembly are generally aligned in a vertical plane.

2. The rack system of claim 1 further comprising:
   a second clamp assembly,
   said second clamp assembly adjustably fixed along said first track.

3. The rack system of claim 1 further comprising:
   an expandable support portion of said first support rail,
   wherein said expandable support portion of said first support rail is sized to fit in a pocket hole of a truck bed.

4. The rack system of claim 1 further comprising:
   a side rack,
   a lateral extension portion of said side rack for spacing said side rack from vehicle,
   wherein said lateral extension portion of said side rack is fixed within said first clamp assembly,
   and a lowered load cup portion of said side rack for securing a load to said side rack below the top side wall of an open bed of a vehicle.

5. The rack system of claim 1 wherein said first carrying rail is an adjustable fixed height linkage mechanism for adjustably fixing the height of the load on said carrying rail above the top side wall of an open bed of a vehicle wherein said first carrying rail is secured within said carry recess of said first clamp assembly.

6. The rack system of claim 1 further comprising:
   a second carrying rail,
   wherein said second carrying rail is fixed at a position along said first track for attachment of cargo.

7. The rack system of claim 1 further comprising:
   at least one of said support rails comprising a plate for clamping a portion of a truck bed top side wall between said plate and an opposing portion of said support rail.

8. The rack system of claim 1 wherein said first horizontal rail comprises a small rail nested within a larger rail.

9. The rack system of claim 1 wherein said carrying rail is one of: a) an elongate tube or b) a solid rail.

10. A method of transporting cargo on an open bed vehicle using the rack system of claim 1, comprising the steps of: fixing said first horizontal rail above and generally aligned with one elongate top side wall of the open bed vehicle by utilizing said two support rails; fixing said carrying rail to said first horizontal rail; and fixing cargo to said carrying rail such that said first horizontal rail, said first and second support rails, and said cargo are generally aligned in a vertical plane; and wherein said cargo is fully supported by said first horizontal rail.

11. The method described in claim 10 wherein the step of attaching a horizontal rail by at least two support rails further comprises placing an expandable portion of said support rail in the pocket hole of the open bed truck.

12. The method described in claim 10 wherein the step of attaching a horizontal rail by at least two support rails further comprises bolting the support rail to the top side wall of an open bed vehicle.

* * * * *